United States Patent
Hara et al.

(10) Patent No.: US 7,009,728 B1
(45) Date of Patent: Mar. 7, 2006

(54) IMAGE PRINTER SYSTEM WITH PRINT AND SAVE FUNCTIONS

(75) Inventors: Yoshihiro Hara, Kishiwada (JP); Nobuo Hashimoto, Ashiya (JP); Masaaki Kuriyama, Sakai (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/496,457

(22) Filed: Feb. 2, 2000

(30) Foreign Application Priority Data

Feb. 3, 1999 (JP) .................................. 11-026297
Feb. 3, 1999 (JP) .................................. 11-026322

(51) Int. Cl.
  *G06K 15/02* (2006.01)
  *G06F 13/00* (2006.01)
(52) U.S. Cl. .................................... 358/1.16; 358/1.13
(58) Field of Classification Search ............... 358/1.16, 358/1.15, 1.9, 1.14, 1.13, 1.6, 1.2, 501, 518, 358/527, 537, 444, 448, 452
See application file for complete search history.

(56) References Cited

U.S. PATENT DOCUMENTS

| | | | | |
|---|---|---|---|---|
| 6,133,947 A | * | 10/2000 | Mikuni | 348/143 |
| 6,421,470 B1 | * | 7/2002 | Nozaki et al. | 382/321 |
| 6,526,158 B1 | * | 2/2003 | Goldberg | 382/115 |
| 6,549,295 B1 | * | 4/2003 | Fantone et al. | 358/1.14 |
| 6,704,119 B1 | * | 3/2004 | Suzuki et al. | 358/1.16 |

FOREIGN PATENT DOCUMENTS

JP 10-150523 6/1998

\* cited by examiner

*Primary Examiner*—Douglas Q. Tran
(74) *Attorney, Agent, or Firm*—Buchanan Ingersoll PC

(57) ABSTRACT

An image printer system that prints out images using image data taken by a digital camera and recorded in a recording medium and that saves the image data in the recording medium in another recording medium. In this system, parameters are set for the printing operation and for the saving operation before they are begun, and the two operations are performed simultaneously or in one sequence. The image data may be corrected for the printing, but the image data that is saved is the original image data.

14 Claims, 24 Drawing Sheets

IMAGE PRINTER SYSTEM WITH PRINT AND SAVE FUNCTIONS

RELATED APPLICATION

This application is based on applications Nos. Hei 11-26297 and Hei 11-26322 filed in Japan, the entire content of which is hereby incorporated by reference.

BACKGROUND OF THE INVENTION

1. Field of the Invention

The present invention pertains to an image printer system that prints images based on image data.

2. Description of the Related Art

Digital cameras and film scanners have been gaining popularity in recent years. The image data obtained using a digital camera is recorded in recording media. Image printer systems that print out images on photosensitive paper based on the image data have also been proposed. Where images are printed on photosensitive paper using an image printer system, the user first selects a printing method (such as printing of specified images). When a printing method is selected, the image data is read from the recording medium and the contents of the data are displayed on the monitor. The user then specifies a number of prints for each image. Based on the image data read, light modulation is then performed and printing is performed by exposing photosensitive paper using the modulated light.

When printing the images, printing and saving of the data, for example, are sometimes desired to be performed simultaneously. In other words, in this case, the image data in the recording medium that may be mounted in a digital camera is desired to be saved in another larger capacity recording medium (CD-ROM or magneto-optical disk, for example) when the images are printed. However, using a conventional image printer system, printing of the image data and saving of the image data in another recording medium cannot be performed at the same time. Therefore, where it is desired to perform printing and saving of the image data simultaneously, the user has to wait for the completion of the printing and then start the data save procedure by designing the data save operation. The user must either remain in the vicinity of the printer during printing, or return to the printer when the printing has been completed, to perform the necessary steps to save the data, and again return when the data has been saved. Consequently, the process is quite inconvenient and is an inefficient use of the user's time.

In addition, various types of digital cameras have become available on the market in recent years, and there is a large variation in the image quality offered by these cameras. In addition, users themselves have various preferences regarding the quality of the printed image. Consequently, many images cannot be printed out with good image quality without undergoing image correction; in other cases, image correction is performed in order to satisfy the user's preference. Image printer systems, therefore, are capable of image correction when performing printing. Where multiple images are printed at the same time, image printer systems also automatically correct the image data and perform printing.

When performing printing with image correction and saving image data at the same time, the question arises regarding which image data should be saved. In other words, it is possible to save the post-correction image data. However, if the post-correction image data is saved, when an attempt is made later to print the same images using the recording medium on which the image data was saved (such as a CD-ROM), it is difficult to print out the original images prior to the image correction. It then might become necessary to perform further image correction to the image data. Then the image data would change every time printing is performed, and the significance of preservation of the original image data would be lost. In addition, there is the possibility that the image quality would continuously deteriorate if image correction were repeated many times.

SUMMARY OF THE INVENTION

The object of the present invention is to eliminate the problems described above.

Another object of the present invention is to provide an image printer system that can efficiently perform image printing and save the mage data in another recording medium.

Yet another object of the present invention is to provide an image printer system that can save the image data without causing a deterioration in image quality.

Yet another object of the present invention is to provide an image printer system that can efficiently perform image printing and save the image data in another recording medium and that can save the image data without causing a deterioration in image quality.

These and other objects are attained by an image printer system having a receiving unit that receives image data, a printing unit that prints out an image based on the received image data, a saving unit that saves the received image data in a recording medium, and a control unit that begins a printing operation by the printing unit and a data save operation by the saving unit consecutively in case that the both operations are instructed before they are begun.

They are also attained by an image printer system having a first portion into which a first medium in which image data is stored is set, a second portion into which a second medium in which image data is to be saved is set, extracting means that extracts the image data from the first medium set in the first portion, a printing unit that prints an image based on the extracted image data, a storing unit that stores the extracted image data in the second medium set in the second portion, and a control unit that begins a printing operation by the printing unit and a data save operation by the saving unit consecutively in case that the both operations are instructed before they are begun.

They are also attained by an image printer system having a receiving unit that receives image data, a correcting unit that corrects the received image data, a printing unit that prints an image based on the corrected image data, and a saving unit that saves the received image data in a recording medium.

The invention itself, together with further objects and attendant advantages, will best be understood by reference to the following detailed description taken in conjunction with the accompanying drawings.

BRIEF DESCRIPTION OF THE DRAWINGS

In the following description, like parts are designated by like reference numbers throughout the several drawing.

DESCRIPTION OF THE PREFERRED EMBODIMENT

Figure 1:
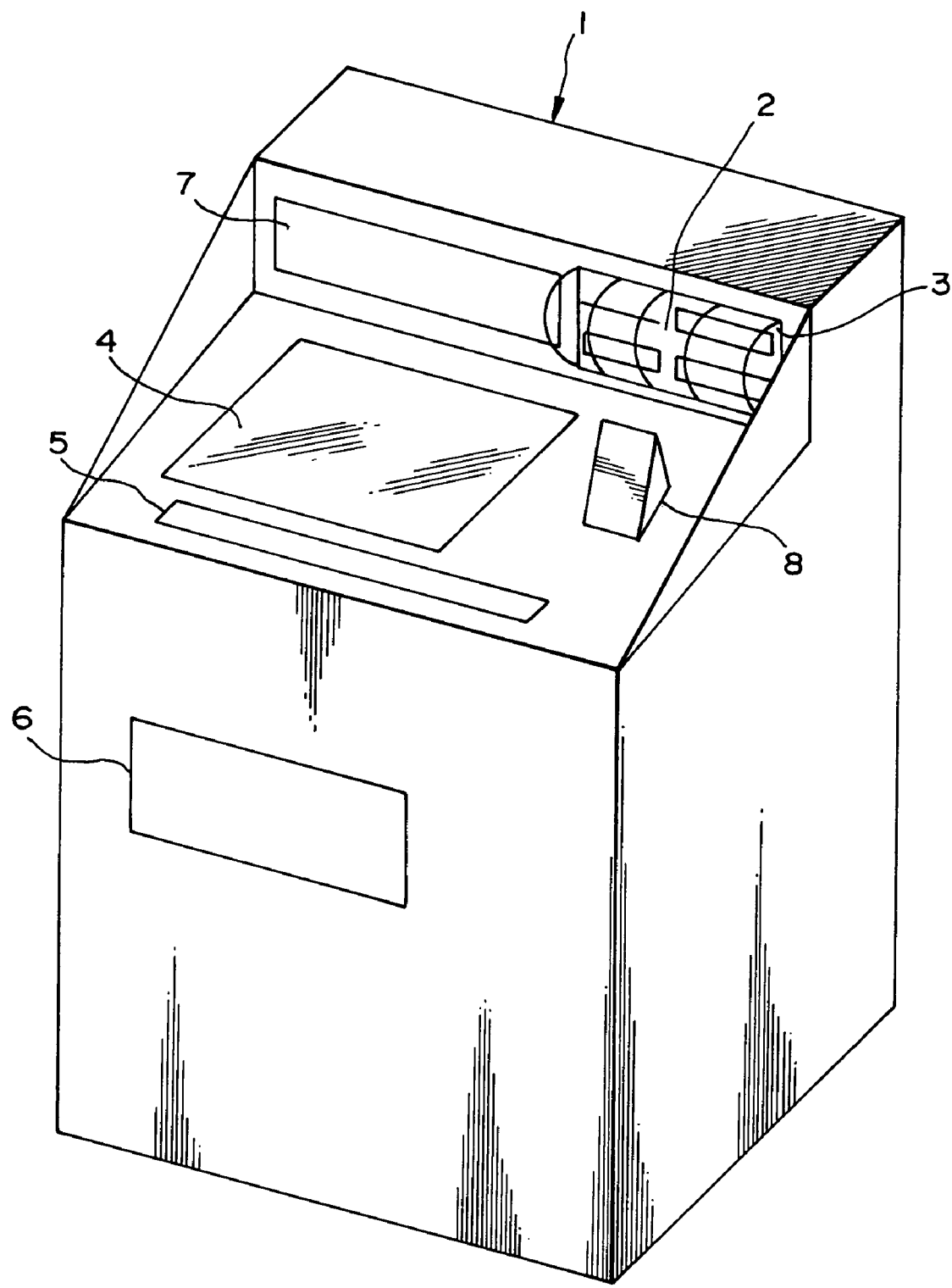
FIG. 1 is a perspective view of an image printer system.

An embodiment of the present invention is explained below with reference to the accompanying drawings. In the drawings, identical numbers indicate the same or equivalent members.

FIG. 1 shows the external view of an image printer system 1. This image printer system 1 is a coin-operated printer system in which the user inserts coins to cover the printing charge, confirms the images and obtains prints. Money for the printing charge is inserted through the slot 8. A media insertion unit 2 is located in the upper part of the printer system, such that the user may insert one of four types of recording media (Smart Media®, Compact Flash®, optical disk and floppy disk). The media insertion unit 2 is equipped with a cover 3 to protect against dust. Instead of a cover, each insertion inlet may be equipped with an anti-dust shutter. A panel 7 is located next to the media insertion unit 2 in order to display the types of media that may be inserted. The monitor 4 is used to display images and operation instructions and has a touch panel on its surface. The keyboard 5 is used to execute various instructions. Inside the printer system are mounted a silver halide printer 16 for the printing of regular photographs and a thermal sublimation printer 18 (see FIG. 3) for the printing of photo-stickers. The prints are ejected from the eject outlet 6. The user inserts money for the charge through the slot 8 and operates the printer system by means of the monitor 4 and the keyboard 5.

Figure 2:
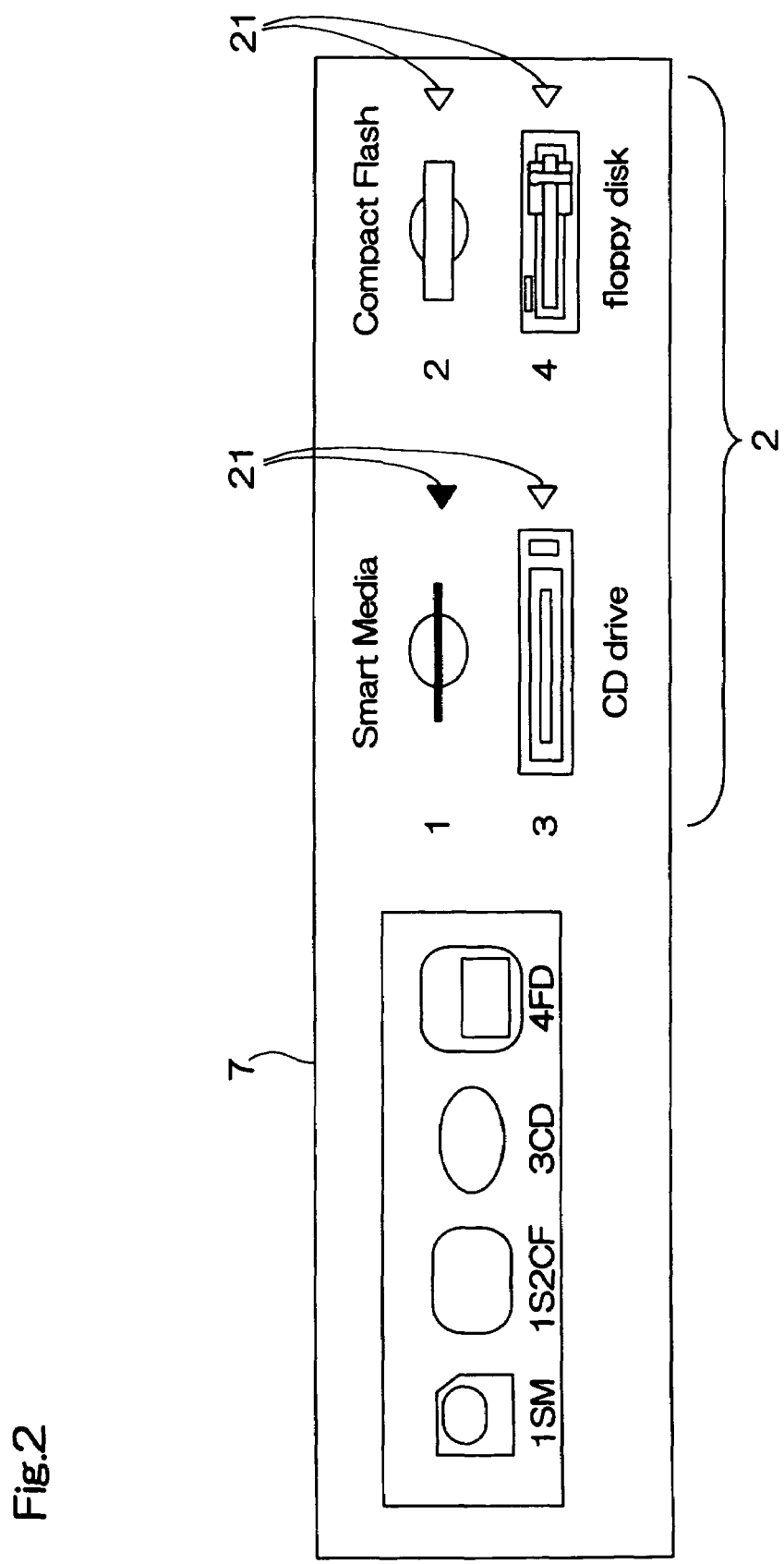
FIG. 2 is a plan view of the panel and media insertion unit.

FIG. 2 shows the recording media insertion unit 2 and the display panel 7 in more detail. The display panel 7 displays the configurations of the four types of image recording media that may be inserted in this printer system. The insertable media are Smart Media® (SM), Compact Flash® (CF), optical disk (CD) and floppy disk (FD). The number to the left of each symbol corresponds to the number of the applicable insertion inlet. The user checks the type of recording medium against the display on the panel 7 and selects the applicable medium type. The means for this selection may consist of touch switches on the panel 7 or numeric inputting through the keyboard 5. The selection may also be made through the touch panel on the monitor 4. When the user selects a medium type, the display 21 next to the insertion inlet that corresponds to the selected medium type begins to flash. In the example shown in FIG. 2, the display 21 corresponding to Smart Media® is flashing. The user then inserts a recording medium in the insertion inlet, the display 21 for which is flashing. Through this operation, the user can identify the type of medium and is prevented from inserting it in the wrong insertion inlet.

Figure 3:
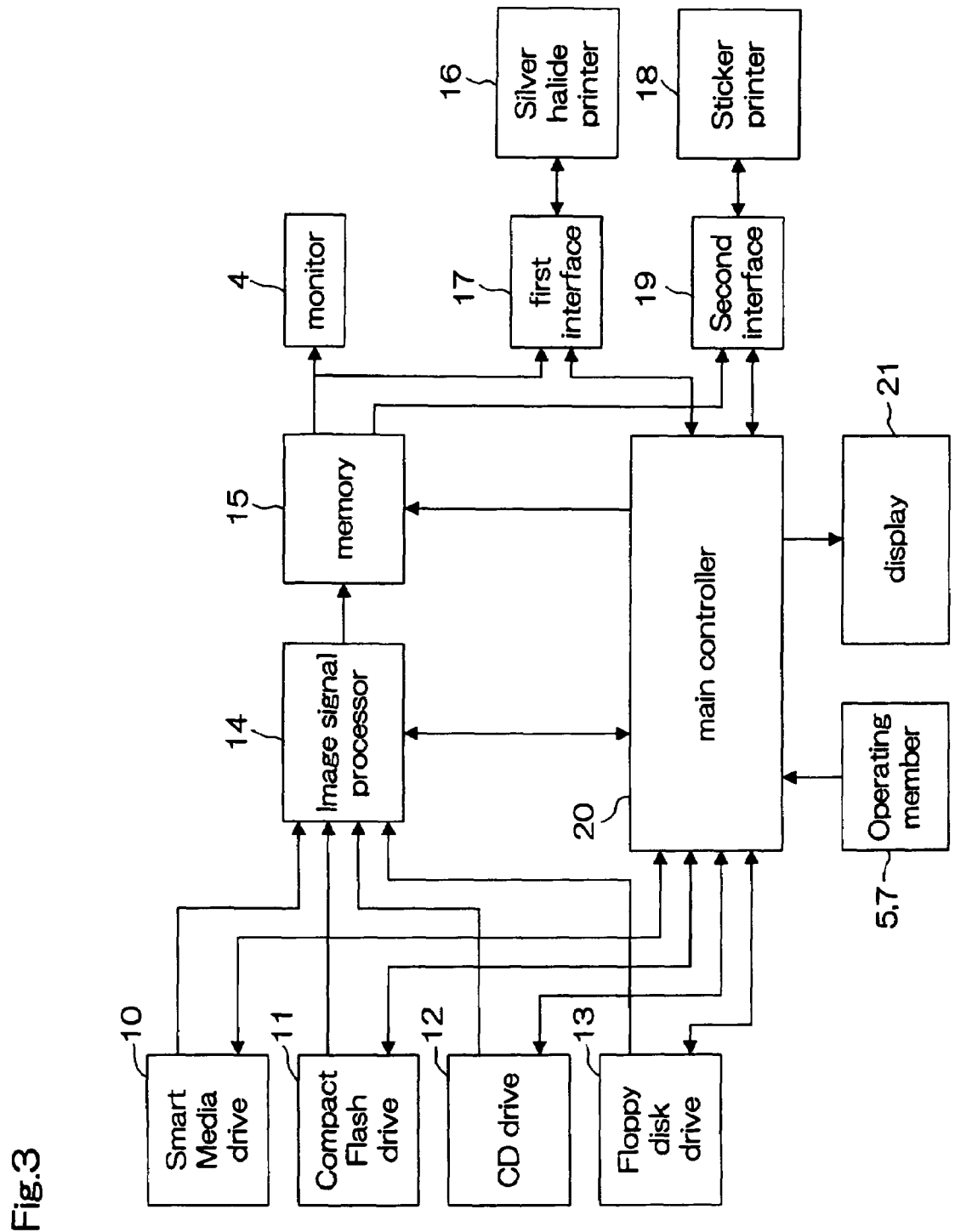
FIG. 3 is a block diagram of the image printer system.

FIG. 3 is a block diagram of the interior of the image printer system. The main controller 20 controls the entire printer system. The drive 10 reads the images recorded in a Smart Media® medium. The drive 11 reads images recorded in a Compact Flash® medium. The drive 12 reads images recorded in an optical disk. The drive 13 reads images recorded in a floppy disk. The image signal processor 14 processes the digital image signals from each medium, which is received from drive 10, 11, 12 or 13, for monitor display and printing purposes. The memory 15 records the images that have undergone image processing. The contents recorded in the memory 15 are reproduced by the monitor 4 and the printers 16 and 18.

The silver halide printer 16 performs exposure of the digital images on silver halide paper and creates digital silver halide prints by carrying out development, bonding and stabilization processes. In this printer system, a PLZT light shutter array not shown in the drawing is used as the silver halide exposure controller. The first interface (IF) 17 is an interface between the main controller and the silver halide printer 16. The print image data recorded in the memory 15 is sent to the silver halide printer 16 via the first interface 17. A print start command is also sent from the main controller 20 to the silver halide printer 16, and print status data is sent from the silver halide printer 16 to the main controller 20 via the first interface 17 as well.

The other printer 18 is a thermal sublimation printer for creating sticker prints. This printer 18 may also comprise a printer using a different method (inkjet printer, thermofusion printer, for example) as long as it is suitable for sticker print creation. The second interface (IF) 19 is an interface between the main controller 20 and the sticker printer 18, and has essentially the same functions as the first interface 17.

The control sequence executed by the main controller 20 in the image printer system will now be explained. FIGS. 4 through 12 are flow charts showing the sequence of the main routine from the service menu display to selection of various services and to printing. FIGS. 13 through 22 shows the subroutines that are called from the main routine. The control will be explained together with the monitor 4 display examples shown in FIGS. 23 through 27, an index print example shown in FIG. 28, a multi-image print example shown in FIG. 29, and a template example shown in FIG. 30.

Figure 4:
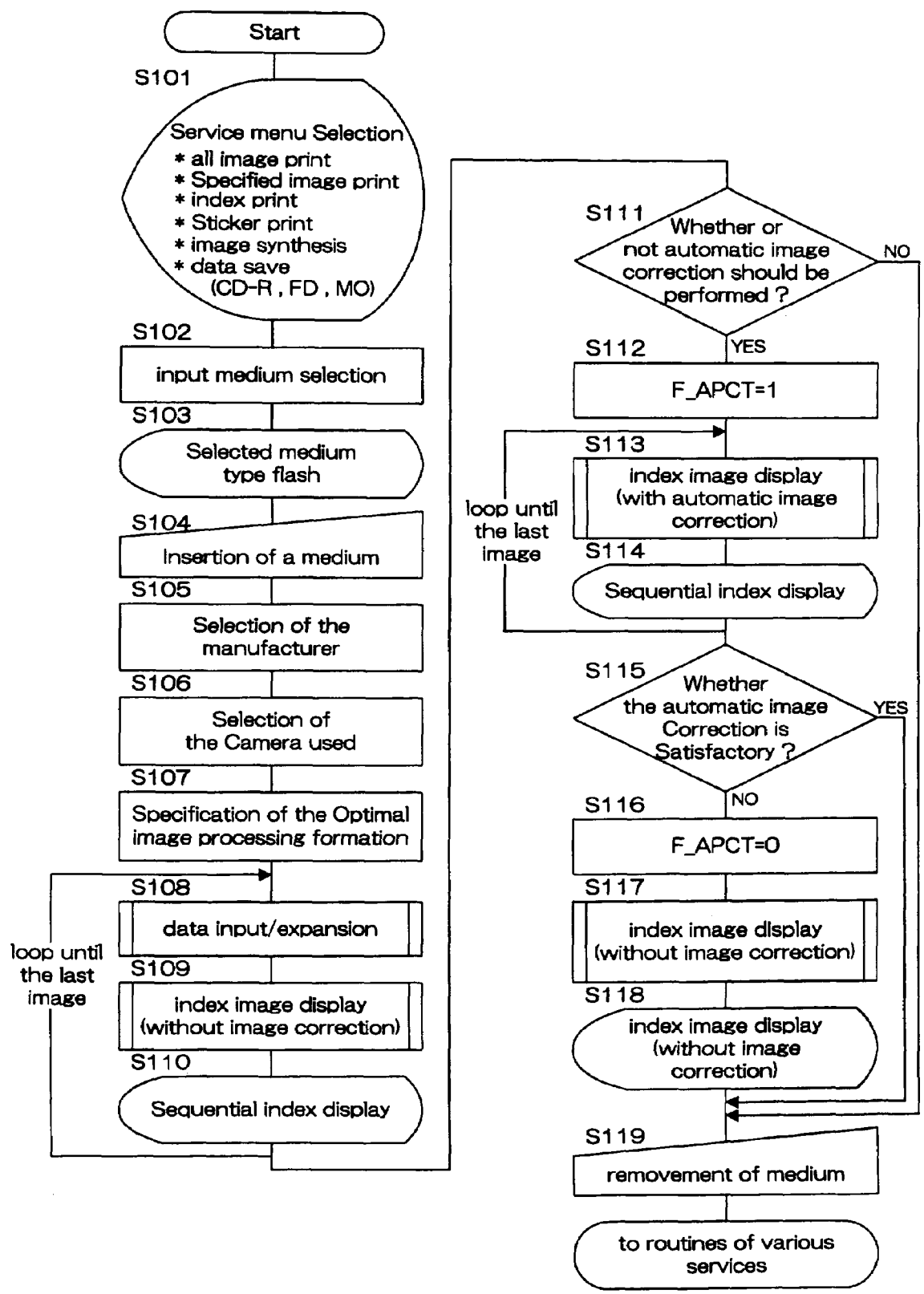
FIG. 4 is a flow chart from the start to the index image display.
Figure 23:
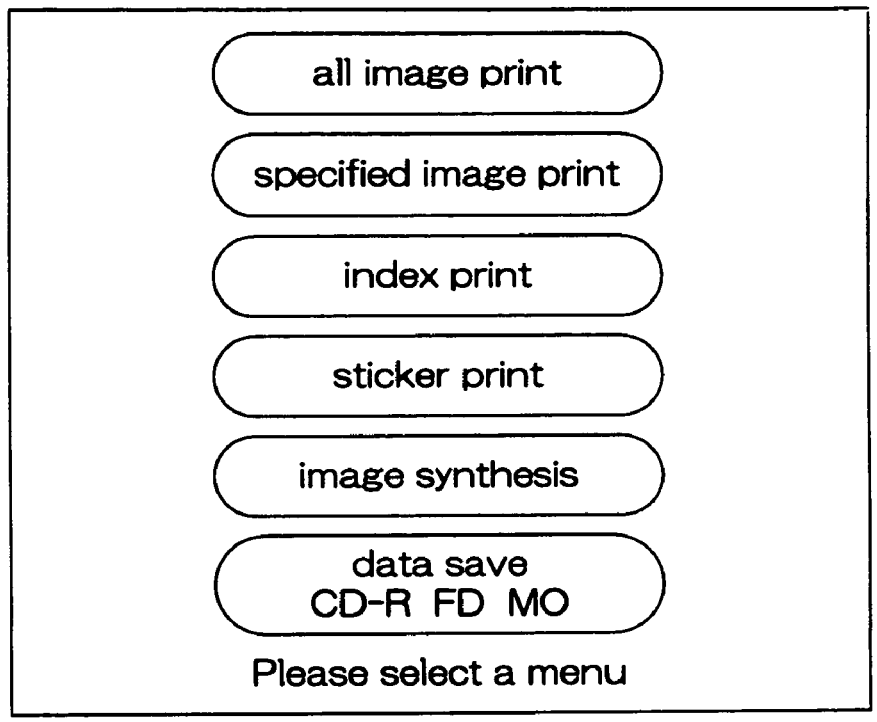
FIG. 23 is shows the display screen of a selection menu.

FIG. 4 is a flow chart showing the sequence from the service menu display to the index image display. When the printer system is started, a menu of services that may be used with the printer system is first displayed on the monitor 4 (step S101; hereinafter the term 'step' will be omitted). FIG. 23 shows the service menu selection screen. The user selects a desired service by means of the touch panel. The six services (print modes) may be used in this embodiment.

(1) All-image print (a mode to print out all of the images recorded on the medium)
(2) Specified image print (a mode to print out images recorded on the medium by individually specifying them)
(3) Index print (a mode to perform index printing)
(4) Sticker print (a mode to perform printing of photo-stickers)
(5) Image synthesis (a mode to perform image synthesis)
(6) Data save (a mode to save the data in a medium such as a CD-ROM, floppy disk or magneto-optical disk)

When image synthesis is selected, a screen from which to select either the multi-image creation mode or the template synthesis mode is then displayed. (This selection screen is not shown in the drawings.) The user selects a desired mode by means of the touch panel.

Index print may be selected from the all-image print and specified image print modes as well.

Image recording media (Smart Media®, Compact Flash®, etc.) that may be mounted in a digital camera are very expensive relative to their storage capacity, and therefore it is preferred that data save may be specified at the same time as printing of the images. Data save therefore may be selected from the all-image print mode, the specified image print mode and the sticker print mode as well.

Index printing and sticker printing includes image processing in which multiple items of input image data are synthesized. As described below, where a print mode that includes such image synthesis is selected, image processing takes a long time, and therefore synthesis of the image data is performed before printing control is begun.

Regardless of which service is selected from the service menu, the sequence up to the index image display is the same. In order for the printer system to incorporate the images and perform index image display, the user first selects a recording medium type to be used for image input (S102). This selection may be made by displaying usable medium types on the monitor or by means of the panel 7 or the keyboard 5. When the user selects an input medium type, the display 21 for the insertion inlet for the selected medium type flashes on the display panel 7 (S103).

The printer system then waits for the user to insert a medium (S104). Further, in order to read the data as quickly and accurately as possible, and also in order to select the best image correction information, the printer system asks the user to select the manufacturer and type of the camera used (S105, S106). Based on the information specified in S105 and S106, the optimal image processing information is specified (S107). Here the optimal correction data is specified based on an analysis of the hues and resolution from the information regarding the manufacturer and type of the camera. Consequently, even images taken using a digital camera having a relatively poor image quality may be printed out with good quality through optimal image correction.

Figure 13:
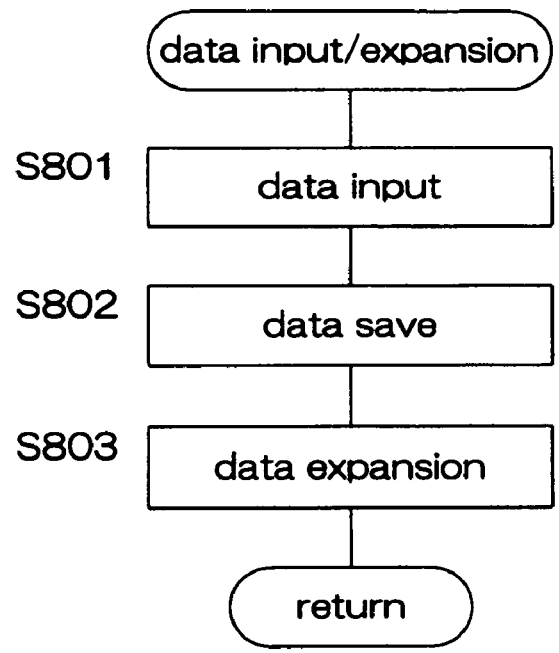
FIG. 13 is a flow chart of the data input/expansion subroutine.

The data input/expansion subroutine (see FIG. 13) is then called, and the image data is input from the medium and expanded (S108). FIG. 13 shows the data input/expansion subroutine (S108 in FIG. 4). After the data is input from the recording medium (S801), the original image data is saved in the memory (S802), so that the original image data may be preserved until the operation is completed and may be accessed at all times. During saving of the image data, this data is directly saved in the storage medium. Because the image to be saved on the medium is raw data (original image data), prints of the same quality may be provided if the storage medium is used for the next session of printing. In addition, the image quality does not deteriorate if data is repeatedly saved on different media. The data (compressed image data) is then expanded (S803) and the printer system returns to the main routine.

Figure 14:
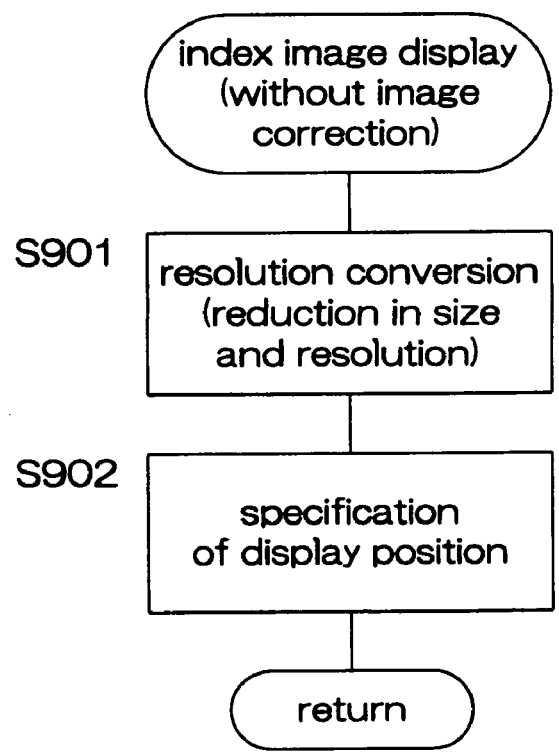
FIG. 14 is a flow chart of the index image display subroutine (with automatic image correction).

After data input and expansion, the printer system displays index images on the screen of the monitor 4 without performing automatic image correction so that the user can first see the original images. The index image display subroutine (without image correction) (see FIG. 14) is called (S109), and resolution conversion (size reduction) is performed for index image display. FIG. 14 shows the index image display subroutine (without image correction) (S109 in FIG. 4). Resolution conversion (reduction in size and resolution) is performed in accordance with the size of the index image display (S901), and the display position in the screen of the monitor 4 is specified for each image (S902). The printer system then returns to the main routine.

The created index image display data is then displayed on the screen of the monitor 4 (S110). Because the images are sequentially displayed on the index screen in the order of reading, the inconvenience of waiting for image reading may be avoided. The steps S108 through S110 are repeated up to the data for the last image.

Figure 24:
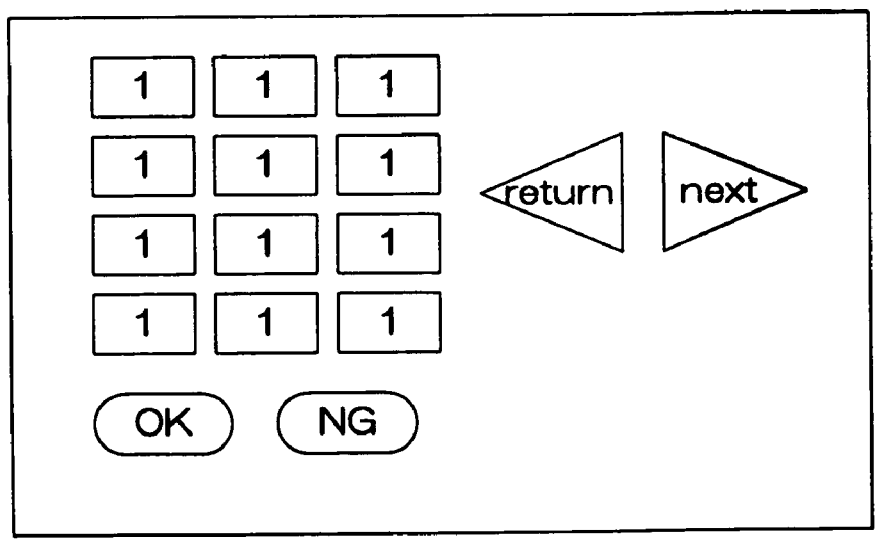
FIG. 24 shows a sequential index image display screen when no image correction is performed.

FIG. 24 shows an example of the index image display screen. Where the number of the recorded images is large, the screen is scrolled using the 'Next' key or the 'Return' key. Because the index image screen on the monitor 4 is displayed using the same alignment as the standard index print, it is easy to understand the image of the index print to be obtained (see FIGS. 24 and 28). In addition, using this form of display, there will be few problems even if no index print preview is displayed.

Figure 15:
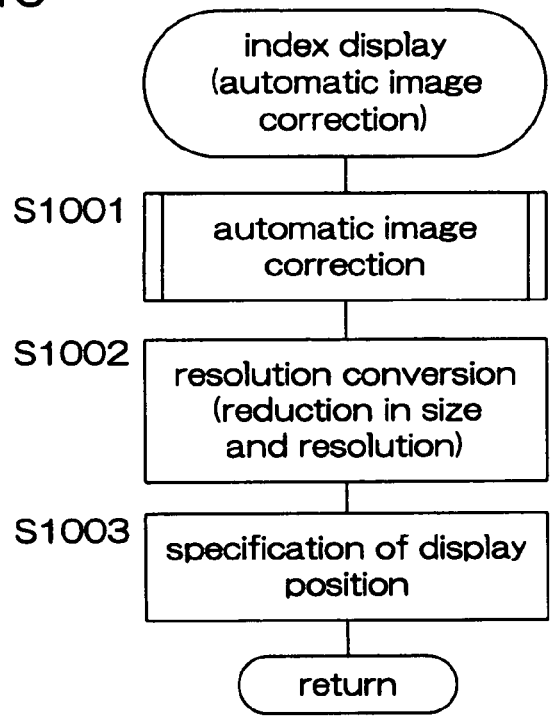
FIG. 15 is a flow chart of the index image display subroutine (without automatic image correction).

When the index images are displayed on the screen of the monitor 4, the printer system asks the user whether or not automatic image correction should be performed (S111). Where automatic image correction is not to take place (NO in S111), the printer system advances to S119 in which various services are processed. On the other hand, where automatic image correction is selected (YES in S111), the flag F_APCT that indicates automatic image correction is set to '1' (S112). The index image display subroutine (with automatic image correction) (see FIG. 15) is then called (S113), and automatic image correction and image data reduction take place. FIG. 15 shows the index image display subroutine (with automatic image correction) (FIG. 14 in S113). Automatic image correction is first performed to the data for each expanded original image (S1001). This automatic image correction converts a relatively poor quality image into a good quality image (see FIG. 16). Resolution conversion (size reduction) is then performed to this data (S1002), and the display position on the screen is specified (S1003). The printer system then returns to the main routine.

As described above, by performing automatic image correction to the original image data, the automatic image correction result for index image display and that for standard size display are made the same. (If the image is reduced first and then subjected to automatic image correction, the finish may slightly vary between the two types of displays.) Where priority is placed on speed rather than on matching the finished image display to the index image display, image reduction is first performed, followed by automatic image correction. Index image display is then sequentially performed on the monitor 4 (S114). Until the last recorded image is processed, the steps of S113 through 114 are repeated while performing automatic image correction, and index images are sequentially displayed. When index image display is completed using the sequence described above, multiple corrected images are displayed on the monitor 4, and therefore the tendency of the image correction of the printer system can be easily seen. Because corrected images are shown after uncorrected images are shown, the effect of the automatic image correction may be clearly seen. If the index images are displayed in two columns or layers, the effect may be observed more even easily.

Because the user can confirm the effect of the correction of all images using the index image display screen, it is very easy for to determine whether the image correction is satisfactory. The printer system then asks the user whether the automatic image correction is satisfactory (S115). The user checks whether the image correction by the printer system with respect to the multiple images being displayed in the index image display screen is satisfactory, and selects whether to perform automatic image correction. Where the user indicates that automatic image correction is preferred, the printer system jumps to S119 and the service selected previously in S101 is performed.

When the user indicates that automatic image correction is unsatisfactory (NO in S115), the state in which no automatic image correction is to be performed is set again (flag F_APCT=0) (S116), the subroutine of index image display without image correction is called (S117), and index images without correction are displayed (S118). The user then reviews these images and makes a final determination.

As described above, because a user may determine whether or not automatic image correction is satisfactory based on the index image display, the user's preferred image quality may be reproduced for images taken using a digital still camera in which a marked image quality tendency often appears throughout the image, and or images taken using a digital still camera that provides a unique image quality. Consequently, prints reflecting the user's preferred image quality may be obtained by means of a simple and convenient operation. In particular, this type of selection method is preferred for an image printer system that may be operated by a layperson, and not only by photographic professionals who handle images on a regular basis (such as photo shop personnel).

Once the image data input and index image display are completed, the user is asked to remove the medium to prevent the image data from being destroyed (S119). The routines of various services are then performed based on the service selected in S101.

As described above, an image reproduction method is first selected, and the image data is then incorporated so that the effect of the automatic correction on the image data may be confirmed. A detailed reproduction method may be selected after this confirmation. Consequently, the most appropriate image reproduction method for the images may be selected while confirming the image data. In this case, if all-image print, as well as index print, is to be performed, or if all-image print is to be performed using one's own preferred print size, or if all-image print and data save are to be performed at the same time, a combination of these image reproduction methods may be specified during the operation. In this way, easy image reproduction may be realized in which the operation time and waiting time are reduced.

The routines for the various services (all-image print, specified image print, index print, sticker print, data save) will now be explained.

Figure 5:
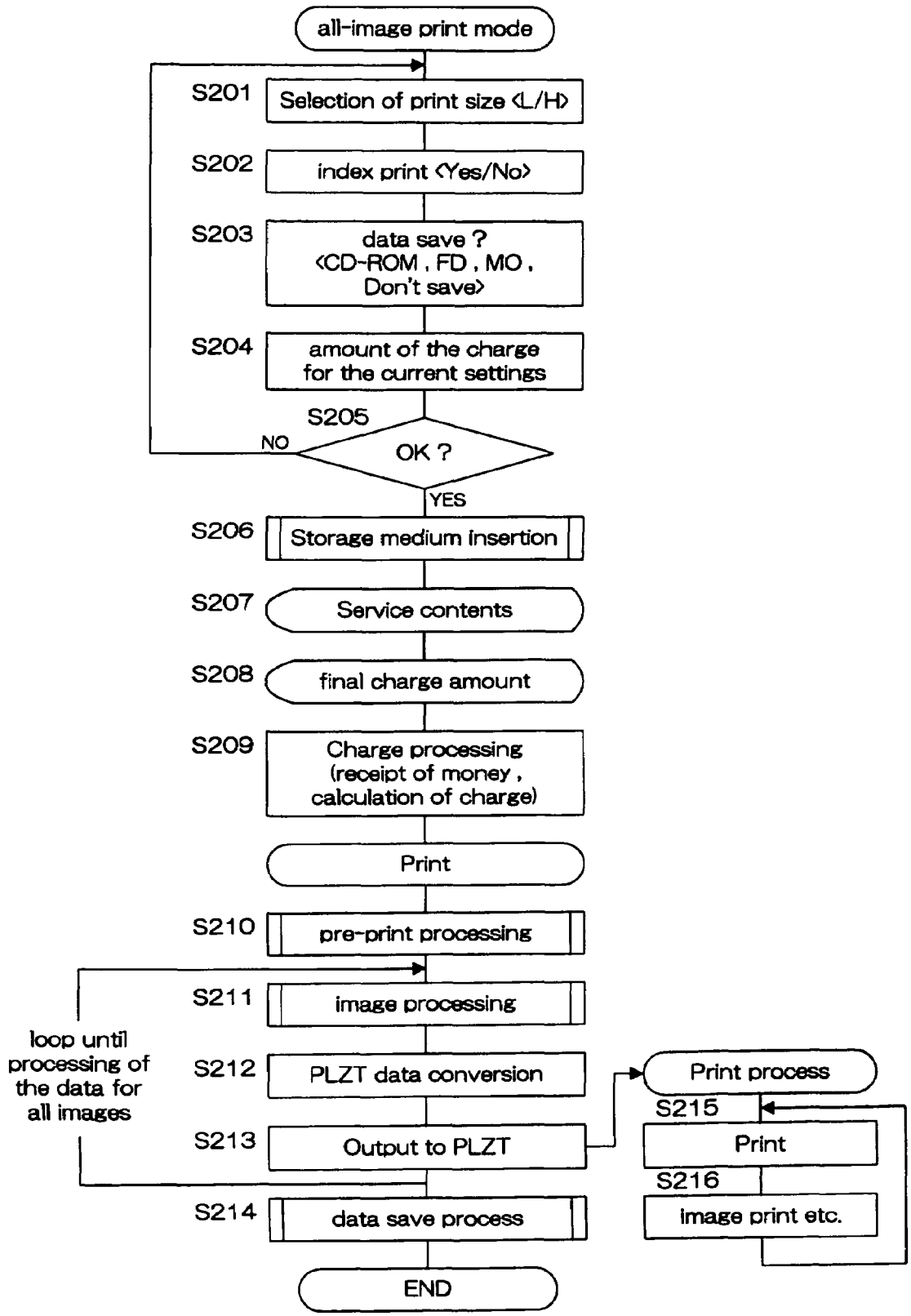
FIG. 5 is a flow chart when the all-image print mode is selected.

The all-image print mode will first be explained. FIG. 5 is a flow chart showing the sequence followed when all-image print is selected. First, at the same time as the display of index images, the following parameters are displayed on the screen of the monitor 4 (S201–S203). Consequently, the type of service to be obtained may be selected.

Print size <L/H>
Index print <Yes/No>
Data save <CD-ROM, FD, MO, Don't save>

Figure 25:
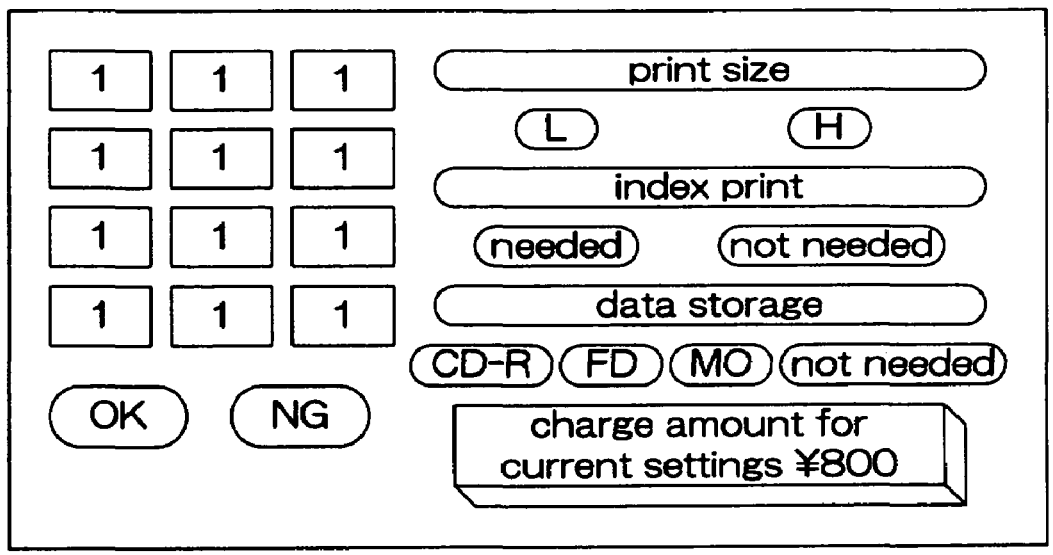
FIG. 25 shows a sequential index image display screen when automatic image correction is performed.

For all-image print, print size='L', index print='Yes' and data save='CD-ROM' are specified by default. However, if changes are desired in this screen, any changes may be made. As these parameters are specified, the amount of the charge for the current settings is calculated and displayed on the monitor 4 (S204). FIG. 25 shows one example of the screen in this state. Because the parameter values may be changed as the index images are displayed and the charge amount for the current settings is displayed, a selection appropriate to the user's budget may be made. When the settings are completed, the user presses the 'OK' button, whereupon the printer system progresses to the next step (S205).

Figure 26:
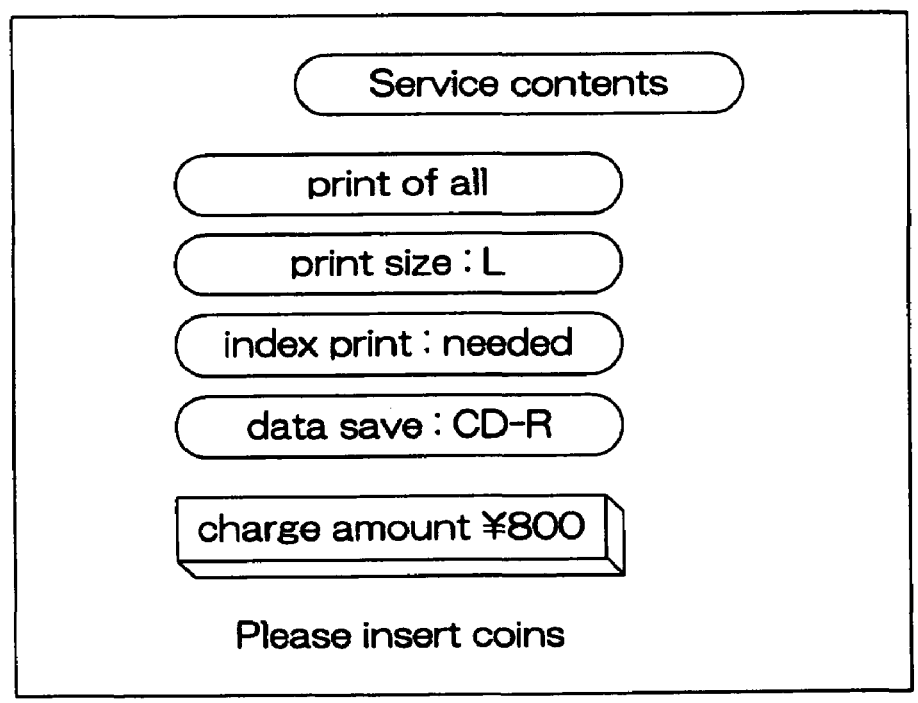
FIG. 26 shows a service contents display screen.

The storage medium insertion subroutine (see FIG. 17) is then called (S206), in which the printer system confirms that data save is specified and waits for the insertion of a storage medium. When the user inserts a storage medium, the service contents and the final charge amount are displayed on the monitor 4 once more (S207–S208), and the printer system waits for money to be inserted. FIG. 26 shows one example of this screen. When money is received, charge processing, including the calculation of change, takes place (S209).

The printer system now progresses to the print control state. First, in order to perform setting and data creation that must be carried out before the print control loop, the pre-print processing subroutine (see FIG. 19) is called (S210). Once the print control loop is entered, the image processing subroutine (see FIG. 21) is called (S211) in order to convert the recorded image data into printable images. Data expansion, automatic image correction and resolution conversion take place in this subroutine. In order to take full advantage of the high-speed performance of the silver halide printer 16, only processes that take a shorter period of time than the exposure time for one image by the printer are performed.

When image processing (S211) is completed, in order to accommodate the characteristics of the PLZT light shutter array of the printer 16, PLZT data conversion such as color correction is performed (S212) so that the image displayed on the screen and the printed image will be the same, and the print image data is saved in the memory to be output to the PLZT light shutter array (S213). The data saved in the memory is sequentially read by the hardware and transferred to the printer 16 via the first interface 17. The print control loop (S211–S213) is repeated until processing of the data for all images, including index images, is completed.

In the printer 16, the data transferred from the memory is exposed to photosensitive paper by means of the PLZT light shutter array (S215), and after such processes as development, fusing, stabilization and drying are performed, an image print is created (S216). The printing routine (S215–S216) is repeated until the data transfer ends. The printing side is designed such that if no data is transferred in S213, it waits for data transfer. However, if there is a wait for data transfer, the silver halide printer, which can process one print at high speed, cannot be taken full advantage of, and therefore it is preferred that the loop comprising S211 through S213 be completed in a shorter period of time than the print routine period.

When the processing of all image data is completed in the print control loop (S211–S213), the data save process (see FIG. 18) takes place (S214). Although a silver halide printer takes several minutes before outputting the first print, the interval between prints is short. Using a silver halide printer, where the time from the beginning of the print data output to the completion of printing is long, if the data save process is performed after the completion of data output, the saving of data is completed at the same time as the completion of printing so long as the data save process is finished within several minutes. In addition, even if the number of images for which data must be saved is large, the waiting time may be minimized using this timing control.

Another point in attaining this control is that the user must complete the insertion of a storage medium before the print control begins. If the insertion is completed, the user is free to leave the printer system when the printing begins. If the user returns within a prescribed period of time, the printing and saving of data are both completed. Image recording media (Smart Media®, Compact Flash®, etc.) that may be mounted in a digital camera are very expensive relative to their memory capacity, and therefore it is likely that the user will specify that data save be performed at the same time as printing of the images. Because the printing and saving of the image data may be simultaneously specified, the redundancy and unnecessary waiting time that would be required if data save had to be specified after the completion of the printing operation may be eliminated.

Figure 6:
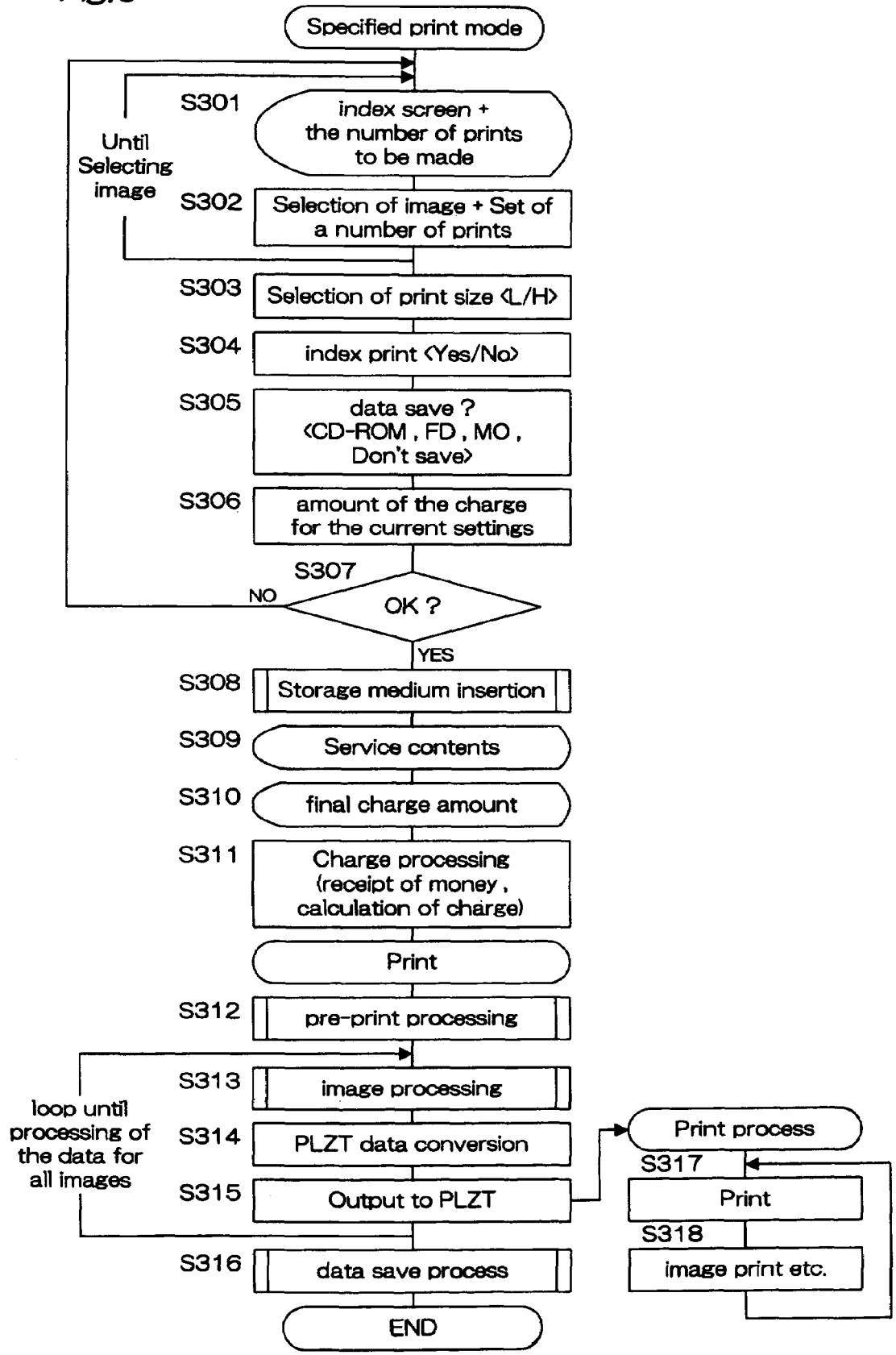
FIG. 6 is a flow chart when the specified image print mode is selected.

The specified print mode will now be explained. FIG. 6 is a flow chart showing the sequence followed when the specified print mode is selected. First, the monitor 4 displays the index screen and the number of prints to be made (S301). If the user selects an image by means of the touch panel from the monitor 4 to set a number of prints, the selected image becomes enlarged, so that the user may set a number of prints while confirming the image in detail (S302). As the index images and the number of prints are displayed, the following parameters are also displayed (S303–S305).

Print size <L/H>

Index print <Yes/No>

Data save <CD-ROM, FD, MO, Don't save>

Where the specified print mode is selected, Print size='L', Index print='No' and Data save=Don't save are specified by default. However, if the user wants to change the parameters, any changes may be made using this screen. The charge amount for the current settings is also calculated and displayed in the same manner as in the all-image print mode (S306). Because the settings may be changed as the index screen is displayed and the charge amount corresponding to the settings is displayed, selection may be made according to the user's budget. When the parameter setting is completed, the printer system progresses to the next step upon the pressing of the 'OK' button by the user (S307).

The printer system then checks if data save is specified, and if it is, it waits for a storage medium to be inserted (S308). When the user inserts a medium, the contents of the service and the final charge amount are displayed again, whereupon the printer system waits for the user to insert money for the charge (S309–S310). When money is received, the printer system performs charge processing, including the calculation of change (S311).

The printer system then progresses to the print control operation. Printing is performed essentially the same way as in the all-image print mode shown with reference to FIG. 5. The steps S313 through S316 of this flow chart correspond to the steps S211 through S216 in FIG. 5 for the all-image print mode. To avoid repetition, they will not be explained again here.

Figure 27:
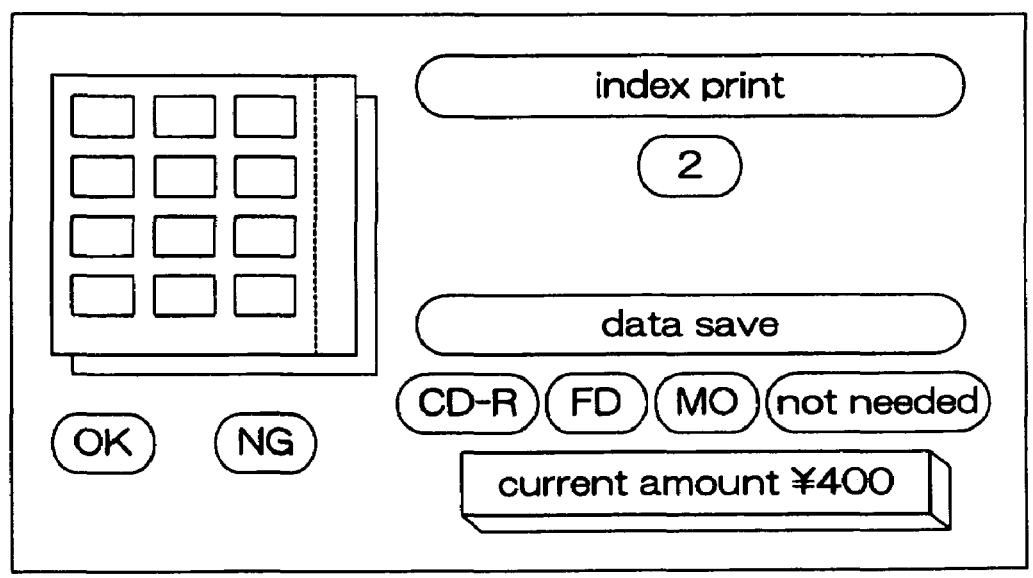
FIG. 27 shows a screen from which parameters for index image creation are specified.
Figure 28:
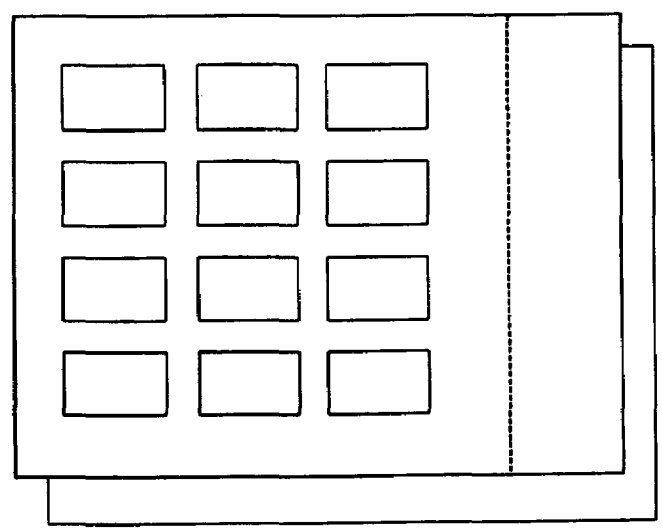
FIG. 28 shows one example of index printing.
Figure 29A:
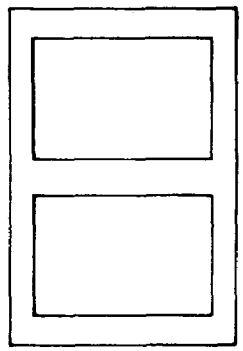
FIGS. 29(*a*), (*b*), (*c*) and (*d*) show examples of synthesized multi-image prints.
Figure 29B:
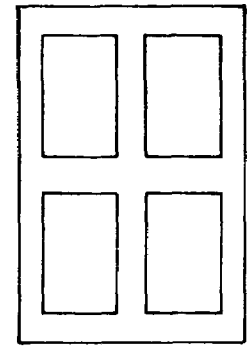
Figure 29C:
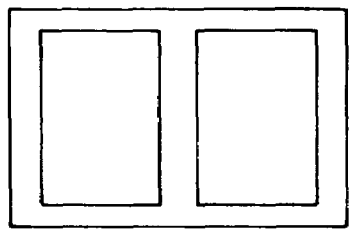
Figure 29D:
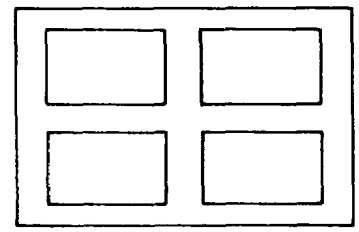
Figure 30A:
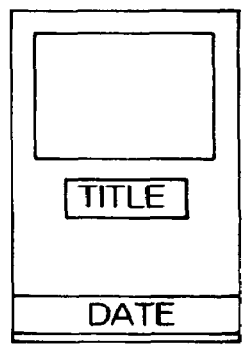
FIGS. 30(*a*), (*b*), (*c*) and (*d*) show template examples.
Figure 30B:
Figure 30C:
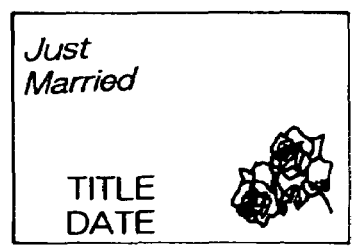
Figure 30D:
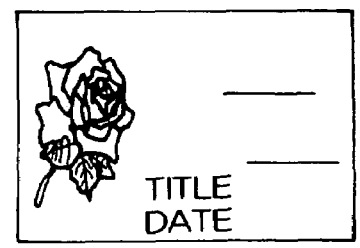

The index print mode will now be explained. The basic index print comprises three images aligned horizontally and four images aligned vertically. When the number of recorded images increases, the size of each image is reduced, so that up to five horizontal images and seven vertical images may be printed. FIG. 27 shows one example of the index screen. FIG. 28 shows one example of the output index print when index print is selected from the service menu (FIG. 23) or a different menu. When the basic settings are used, a print with a dotted trim line is output. By trimming the print along this line, the print may be housed in a CD-ROM case.

In the index image display screen displayed when the index print mode is selected, as explained below with reference to FIG. 22, if more than 35 (5×7) images are recorded in the medium, all of them cannot be printed using the standard print size. Therefore, the user may select if the index images should be printed on a horizontally long piece of paper or they should be printed on more than one pieces of paper. Because this selection may be made when printing out index images from a recording medium on which data for a large number of images is recorded, the user may obtain an index print in the preferred form.

Figure 7:
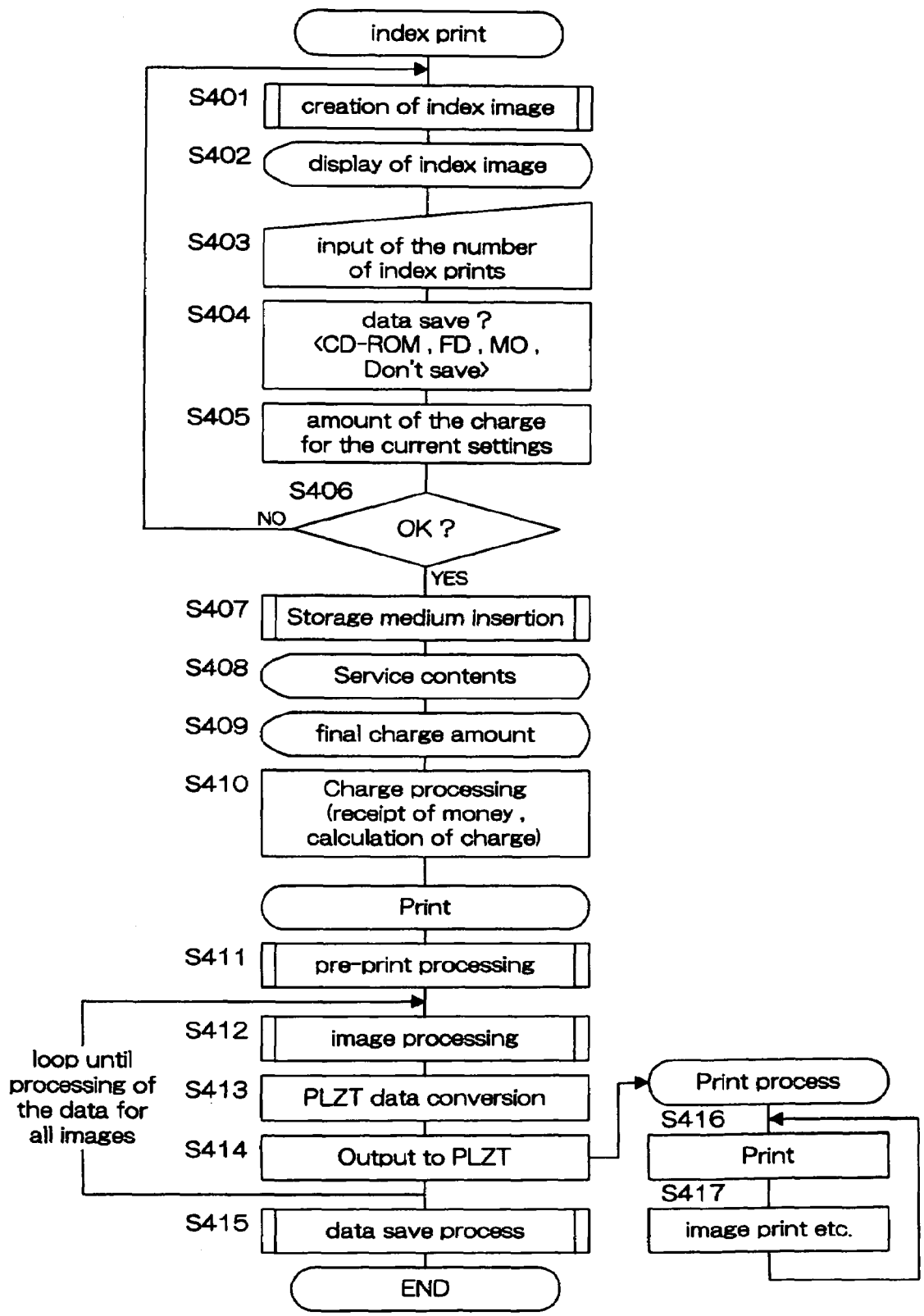
FIG. 7 is a flow chart when the index print mode is selected.

FIG. 7 is a flow chart showing the sequence followed when the index print mode is selected. When the index print mode is selected, index image data is first created in order to display the manner in which the index print is output (S401, see FIG. 22). The created index image data undergoes resolution conversion and images are displayed on the monitor 4 in the same manner as index print (S402). FIG. 27 shows one example of the display screen. This screen also displays the specified number of index prints (S403), the specification regarding data save (S404) and the current charge amount (S405). The default settings for the index print mode are Number of index prints='1' and Data save='CD-ROM', but the settings may be changed by the user.

While confirming the index print preview screen and the current charge amount, if the user likes them, she presses the 'OK' button, whereupon the printer system progresses to the next step (S406).

If data save is selected, the printer system waits for the insertion of a storage medium (S407). When a medium is inserted, an processing that is essentially the same as that performed in the all-image print mode shown in FIG. 5 or the specified image print mode shown in FIG. 6 takes place (S408–S417). The steps S408 through S417 in this flow chart correspond to the steps S207 through S216 in FIG. 5 for the all-image print mode. They will not be explained here in order to avoid repetition.

In the example explained above, the form of the index print may be selected by the user only when the number of the images to be printed out is higher than a prescribed number. However, in a modified version, whenever index print is selected, regardless of the number of images to be printed, a first printing form, in which multiple images are printed on one piece of paper, or a second printing form, in which multiple images are printed on two or more pieces of paper, may be selected from the monitor screen. Printing is then performed using the form of printing selected by the user.

In the above explanation, index print was explained as an example of printing data for multiple images onto one piece of paper. However, in other print modes where printing of data for multiple images on one piece of paper may regularly take place, it can be made possible to select whether printing of the data for multiple images may be performed on more than one piece of paper, a horizontally long piece of paper or a vertically long piece of paper.

Figure 8:
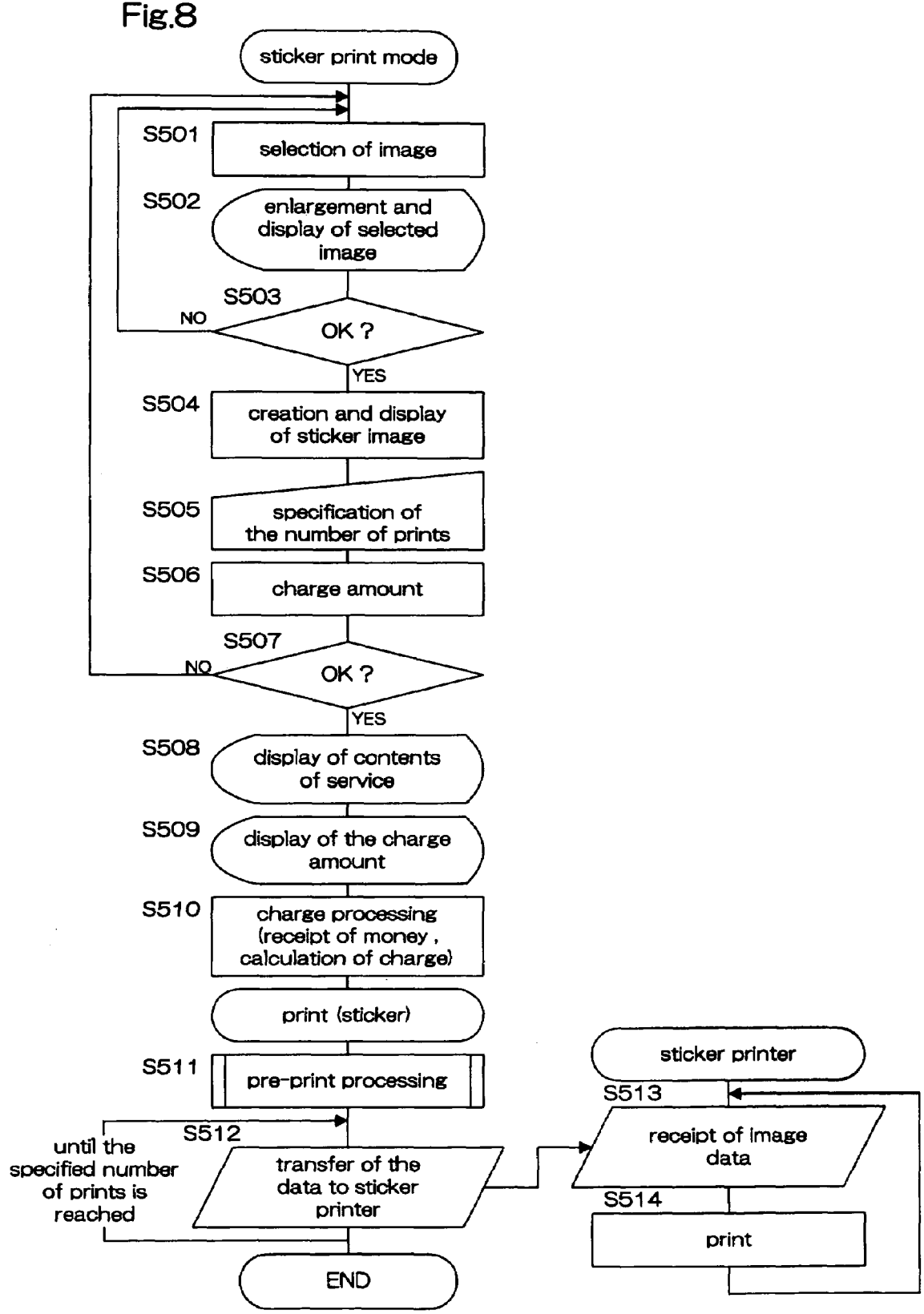
FIG. 8 is a flow chart when the sticker mode is selected.

The sticker print mode will now be explained. FIG. 8 is a flow chart for the sticker print mode. When sticker print is selected, the user is first asked to select the images that will be made into stickers (S501). The selected images are then enlarged and displayed (S502), and if the user is comfortable with the images, the printer system progresses to the next step (S503).

The resolution of the selected images is then converted, such that the images are reduced in size and aligned to create sticker image data. The created sticker image data is then displayed as a preview (S504). While looking at the preview display, the user specifies a number of prints (S505). The user then checks the charge amount (S506), and if it is acceptable, the user presses the 'OK' button (S507).

The printer system then displays the contents of the service and the charge amount for confirmation purposes (S508–S509), and progresses to the sticker print control routine after performing charge processing (receiving money and calculating the change)(S510). In the pre-print processing routine (see FIG. 19), processing necessary before print control takes place is performed (S511).

The printer system then transfers the data to the sticker printer 18 (thermal sublimation printer) until the specified number of prints is reached (S512). The sticker printer 18 receives the image data via the second interface 19 (S513) and performs the printing routine (S514). This printing routine is repeated until printing of all image data is finished.

The image synthesis mode will now be explained. In this mode, multi-images and template images are printed. FIG. 29 shows some examples of multi-image prints. Two or four images are synthetically aligned horizontally or vertically, and the multi-images thus obtained are printed on one piece of paper. FIG. 30 shows some template examples. The selected template is synthesized with the image.

Figure 9:
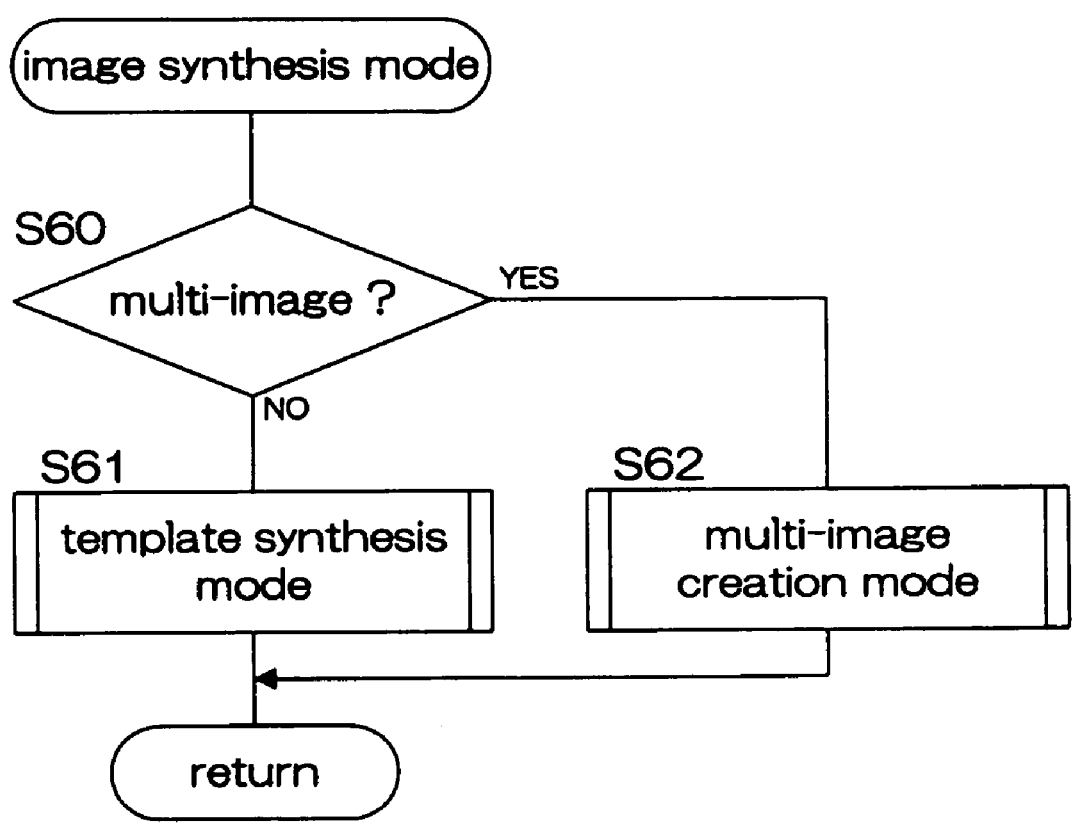
FIG. 9 is a flow chart when the synthesized image print mode is selected.

FIG. 9 is a flow chart showing the sequence followed in the image synthesis mode. In the image synthesis mode, the user first selects the multi-image creation mode or the template synthesis mode by means of the touch panel. It is then determined whether or not the selected mode is the multi-image creation mode (S60). If the multi-image creation mode is selected, the printer system enters the multi-image creation routine (S61, see FIG. 10), and if the multi-image creation mode is not selected, it enters the template synthesis routine (S62, see FIG. 11).

Figure 10:
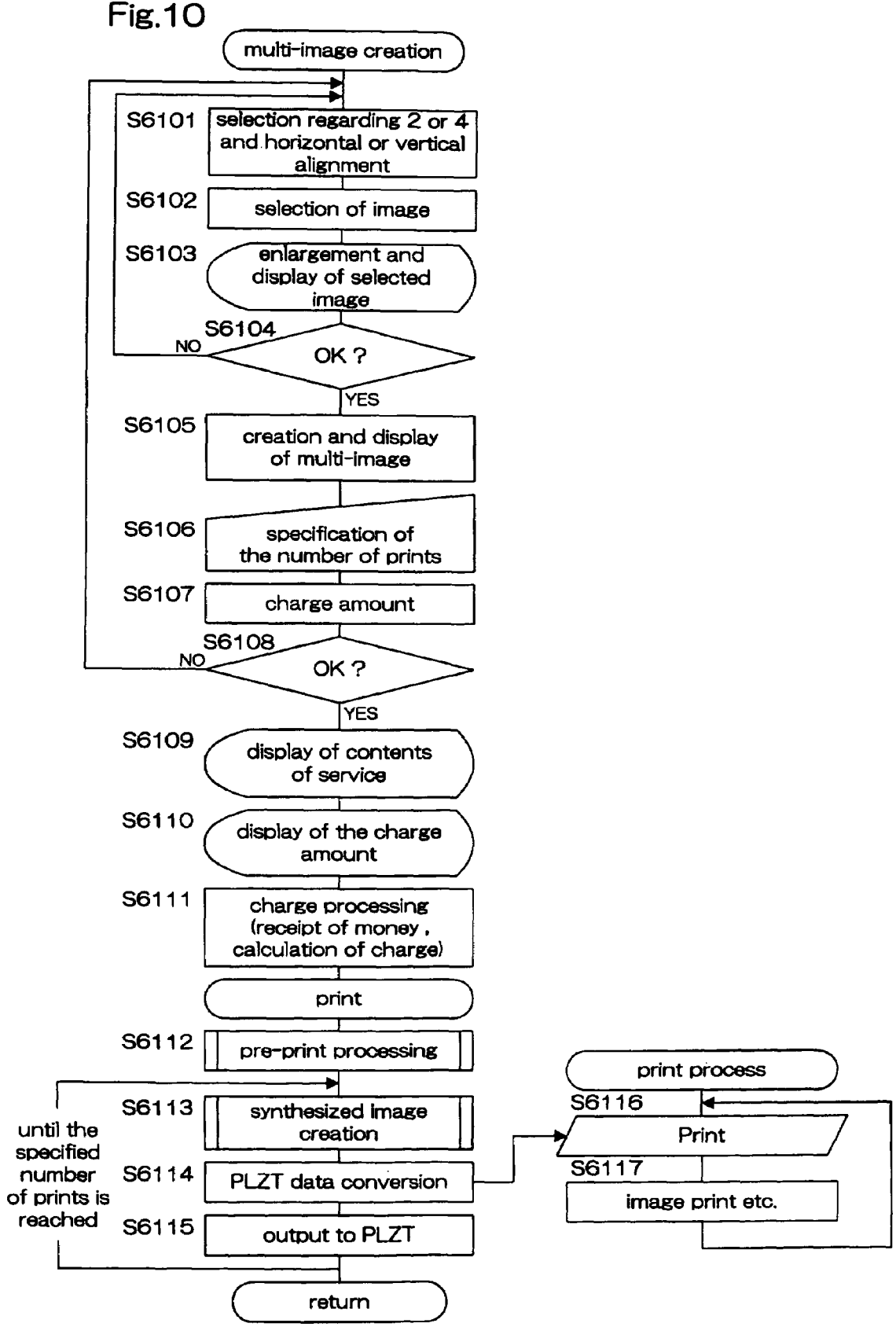
FIG. 10 is a flow chart of the multi-image creation subroutine.

FIG. 10 is a flow chart showing the sequence followed in multi-image creation (S61 in FIG. 9). First, the user selects the type of multi-image configuration to be created (S6101). In this example, selection may be made regarding two or four images and horizontal or vertical alignment. The printer system then asks the user to select multiple images to print (S6102). The selected images are then enlarged and displayed (S6103), and if the user is satisfied with the selected images, the printer system progresses to the next step (S6104).

The resolution of the selected images is then converted, such that the images are reduced in size and aligned to create multi-image data. The created multi-image data is then displayed as a preview (S6105). While viewing the preview display, the user specifies a number of prints (S6106). The user then checks the charge amount (S6107), and if it is acceptable, the user presses the 'OK' button (S6108).

The printer system then displays the contents of the service and the charge amount for confirmation purposes (S6109–S6110), and progresses to the multi-image print control routine after performing charge processing (receiving money and calculating the change)(S6111).

In the pre-print processing routine (see FIG. 19), processing necessary before the print control takes place is performed (S6112).

The synthesized image creation process then takes place (S6113), in which data is then converted into PLZT data (S6114) and the PLZT data is output (S6115). This routine is repeated until the specified number of prints is reached. The printer 18 then performs the printing routine (S6116) including the developing process (S6117). This printing routine is repeated until printing of all image data is finished.

Figure 11:
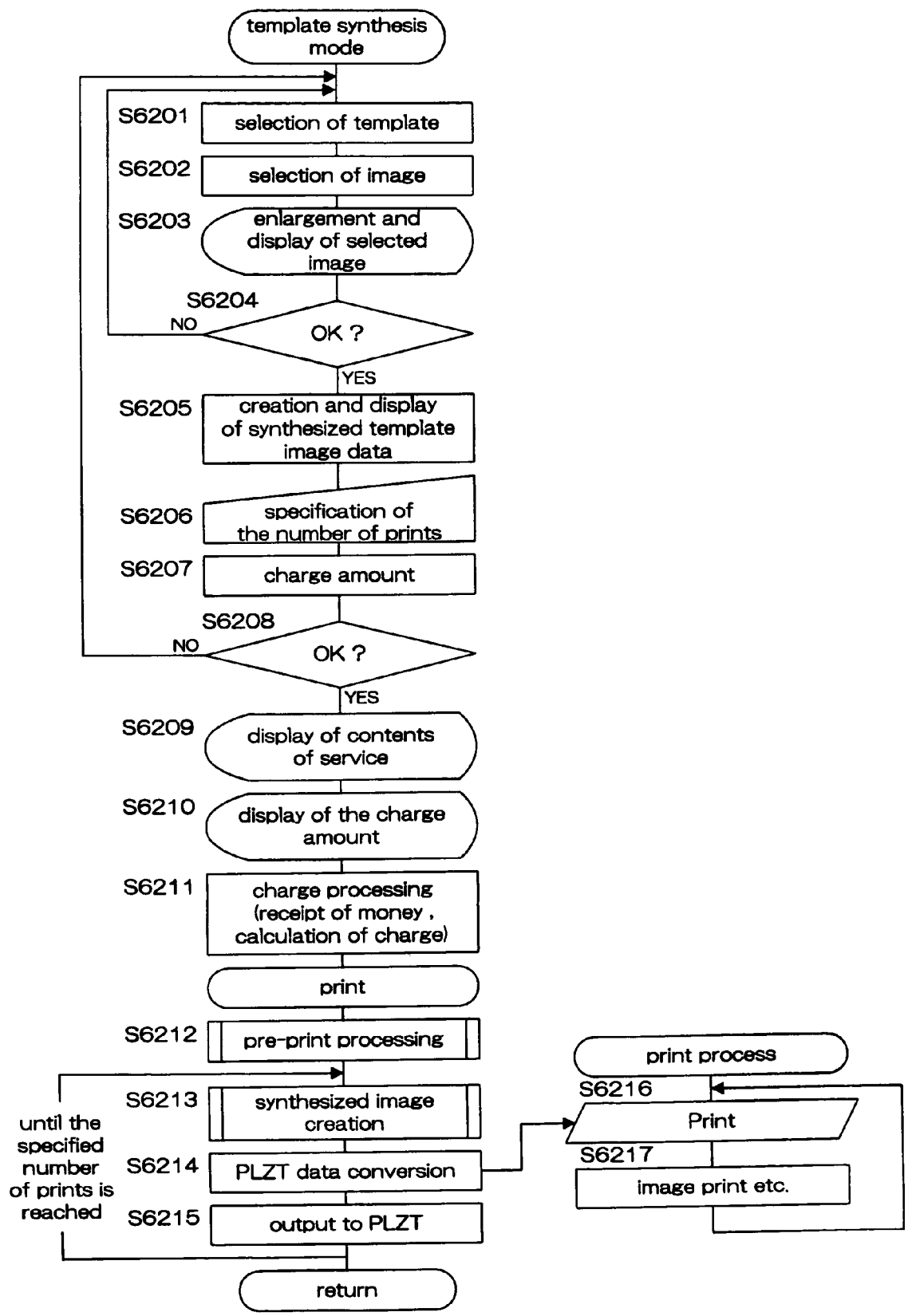
FIG. 11 is a flow chart of the template image synthesis subroutine.

FIG. 11 is a flow chart showing the sequence followed in the template synthesis mode (S62 in FIG. 9). First, the user selects a template (S6201). The printer system then asks the user to select an image to synthesize with the template (S6202). The selected image is enlarged and displayed (S6203), and if the user is satisfied with the image, the printer system progresses to the next step (S6204).

Template image data is synthesized from the selected template and image. The synthesized template image data is then displayed as a preview (S6205). While looking at the preview display, the user specifies a number of prints (S6206). The user then checks the charge amount (S6207), and if it is acceptable, the user presses the 'OK' button (S6208).

The printer system then displays the contents of the service and the charge amount for confirmation purposes (S6209–S6210), and progresses to the template image print control routine after performing charge processing (receiving money and calculating the change)(S6211).

In the pre-print processing routine (see FIG. 19), processing necessary before the print control operation takes place is performed (S6212).

Image processing then takes place (S6213), the data is converted into PLZT data (S6214) and the PLZT data is output (S6215). This routine is repeated until the specified number of prints is reached. The printer 18 then performs the printing routine (S6216) including the developing process (S6217). This printing routine is repeated until printing of all image data is completed.

Figure 12:
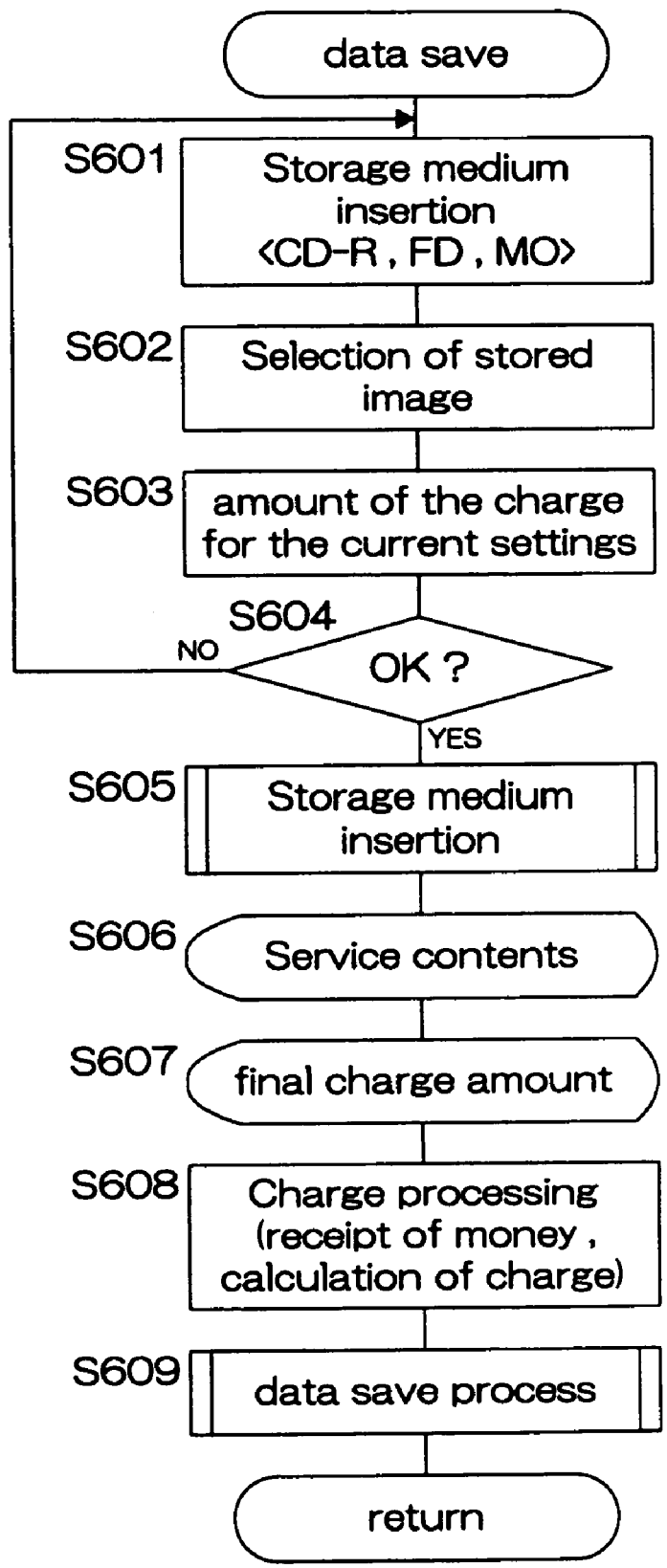
FIG. 12 is a flow chart when data save is selected.

The data save mode will now be explained. FIG. 12 is a flow chart showing the sequence followed in the data save mode. First, the user selects the type of storage medium (S701). The default setting is 'CD-ROM', which cannot be overwritten, but the setting may be changed according to the user's preference. The user then selects the images to save (S702). The default setting is to save 'All' images in the recording medium, but the saving of particular images may also be selected. The printer system then calculates the charge amount based on the type of storage medium, the number of images to save and the image size, and displays the calculation result (S703). One example of the calculation is shown below, which is applied regardless of the type of storage medium.

Basic charge=¥100

¥10 per image (less than 100 KB), ¥5 per image (100 KB–1 MB), ¥30 (more than 1 MB)

The charge may be changed based on the resolution. If the settings are acceptable, the user presses the 'OK' button (S704), whereupon the printer system progresses to the next step.

The printer system then calls the storage medium insertion subroutine and waits for a storage medium to be inserted (S705). After performing confirmation of the contents of the service and the charge amount (S706–S707), the printer system performs charge processing (receiving money and calculating the change)(S708) and progresses to the next step.

The routine comes to an end when the data save subroutine (see FIG. 18) is called to save the data (S709).

The various subroutines will now be explained below.

Figure 16:
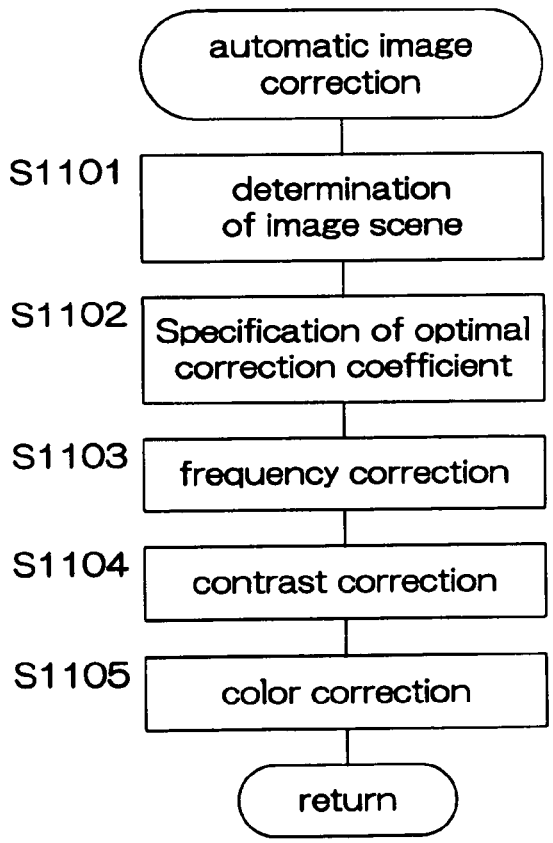
FIG. 16 is a flow chart of the automatic image correction subroutine.

FIG. 16 shows the automatic image correction subroutine (S1001 in FIG. 15, etc.). This subroutine is performed in order to reproduce the images with good image quality even if the input image quality is relatively poor. First, the image scene is determined (S1101). The printer system automatically determines the scene of the image, including the portrait component, scenery component, light source component, etc., to perform the optimal correction for the scene. Based on the determined contents of the scene and the camera information specified in S107 (the manufacturer and type of the camera), the optimal correction coefficient is specified (S1102). Using the specified correction coefficient, frequency correction (edge enhancement, noise reduction, etc.), contrast correction (increased contrast, etc.), and color correction (skin color correction, light source correction, camera characteristics correction, etc.) are performed (S1103–S1105) and the printer system returns to the main routine.

Figure 17:
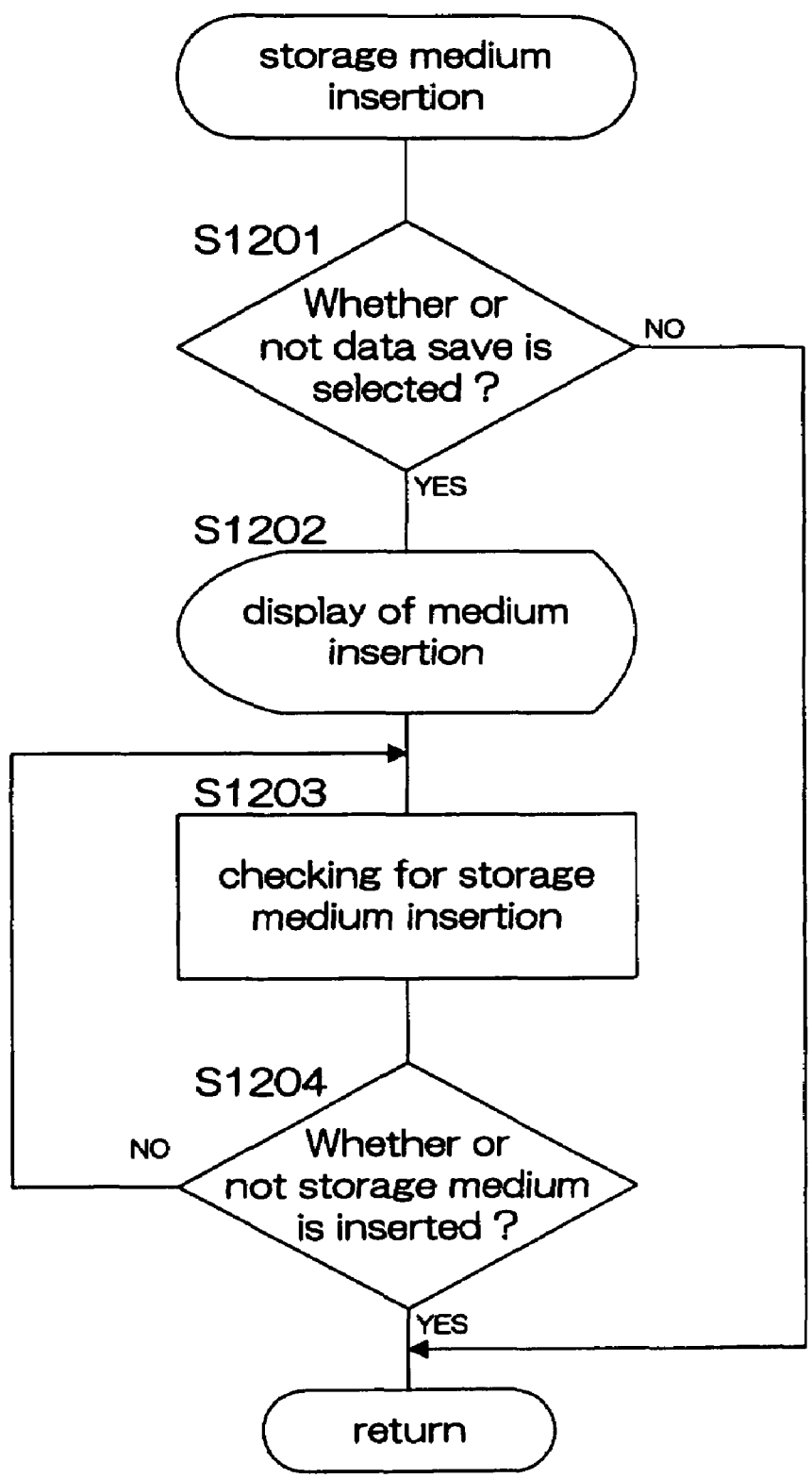
FIG. 17 is a flow chart of the storage medium insertion subroutine.

FIG. 17 shows the storage medium insertion subroutine (S206 in FIG. 5, S308 in FIG. 6, S407 in FIG. 7, S505 in FIG. 8). This subroutine is performed in order to urge the user to insert a storage medium and wait for the insertion of a storage medium when data save is selected. The printer system first checks whether or not data save is specified (S1201). Where it is not specified, it is not necessary for the user to insert a storage medium, and therefore the printer system returns to the main routine without any further processing. If data save is specified, the printer system performs display to urge the user to insert a storage medium (S1202), and waits for the insertion of a storage medium by the user. It then checks for the insertion of a storage medium (S1203), and if a storage medium is inserted (S1204), the printer system returns to the main routine.

Figure 18:
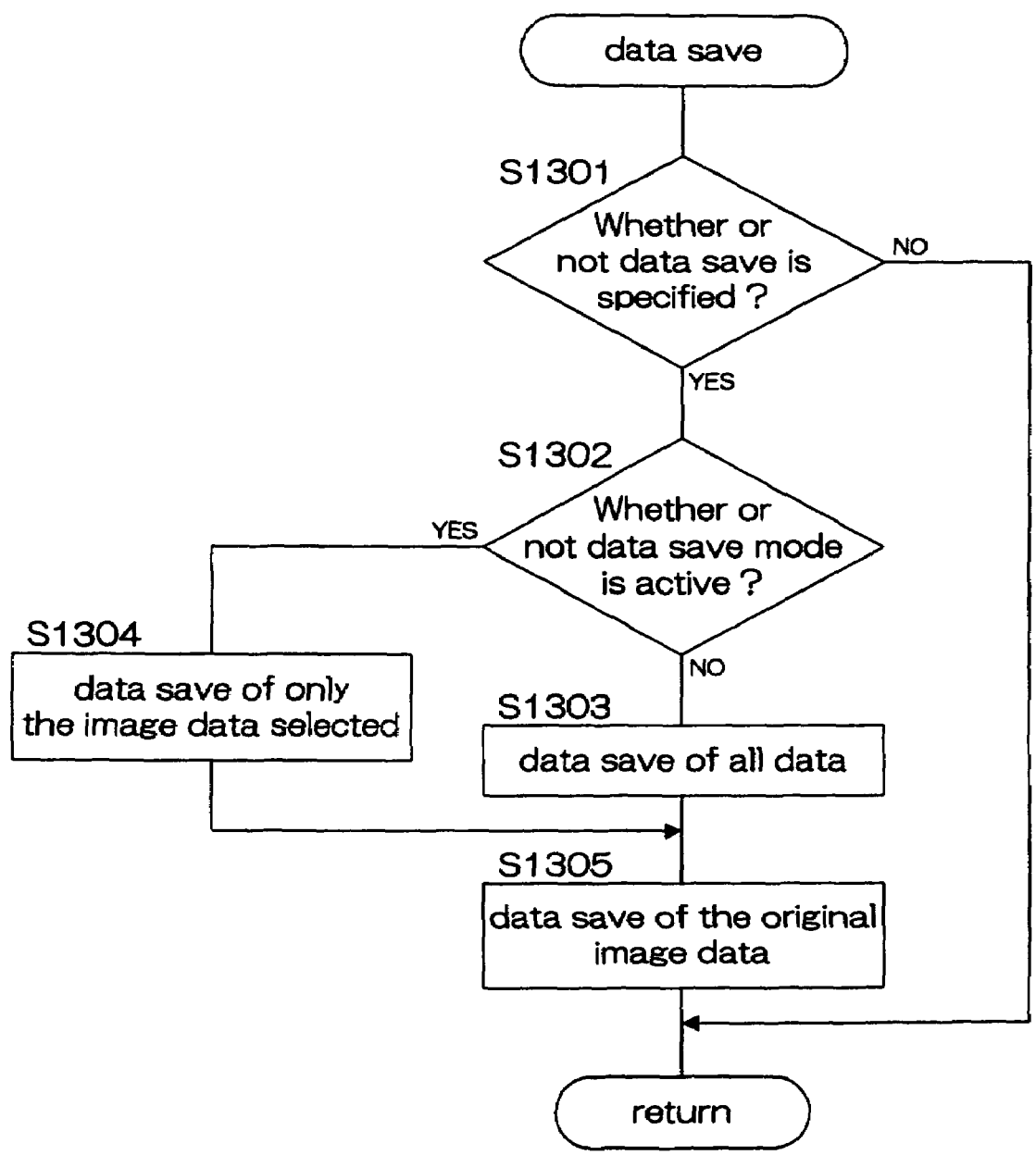
FIG. 18 is a flow chart of the data save subroutine.

FIG. 18 shows the data save subroutine (214 in FIG. 5, 316 in FIG. 6, S415 in FIG. 7, S509 in FIG. 8). The printer system first checks whether or not data save is specified. If it is not specified, the printer system returns to the main routine without any further processing (S1301). It then checks if the data save mode (a mode activated because the 'data save' service is selected from the service selection menu) is active (S1302). If it is not active (and instead any other mode such as all-image print or specified image print is active), it specifies data save of all data in the recording medium (S1303). If the data save mode is active, that means that the data to be saved is to be selected, and therefore the printer system specifies the saving of only the image data selected by the user (S1304). It saves the original image data corresponding to the specified image number in the storage medium (S1305). By saving the original image data, the adverse effect of image deterioration caused by repeated image correction may be avoided. In addition, if the original image data is preserved, when printing is performed using this printer system by inputting this preserved data, image prints having the same image quality as obtained during the original printing may be achieved.

Figure 19:
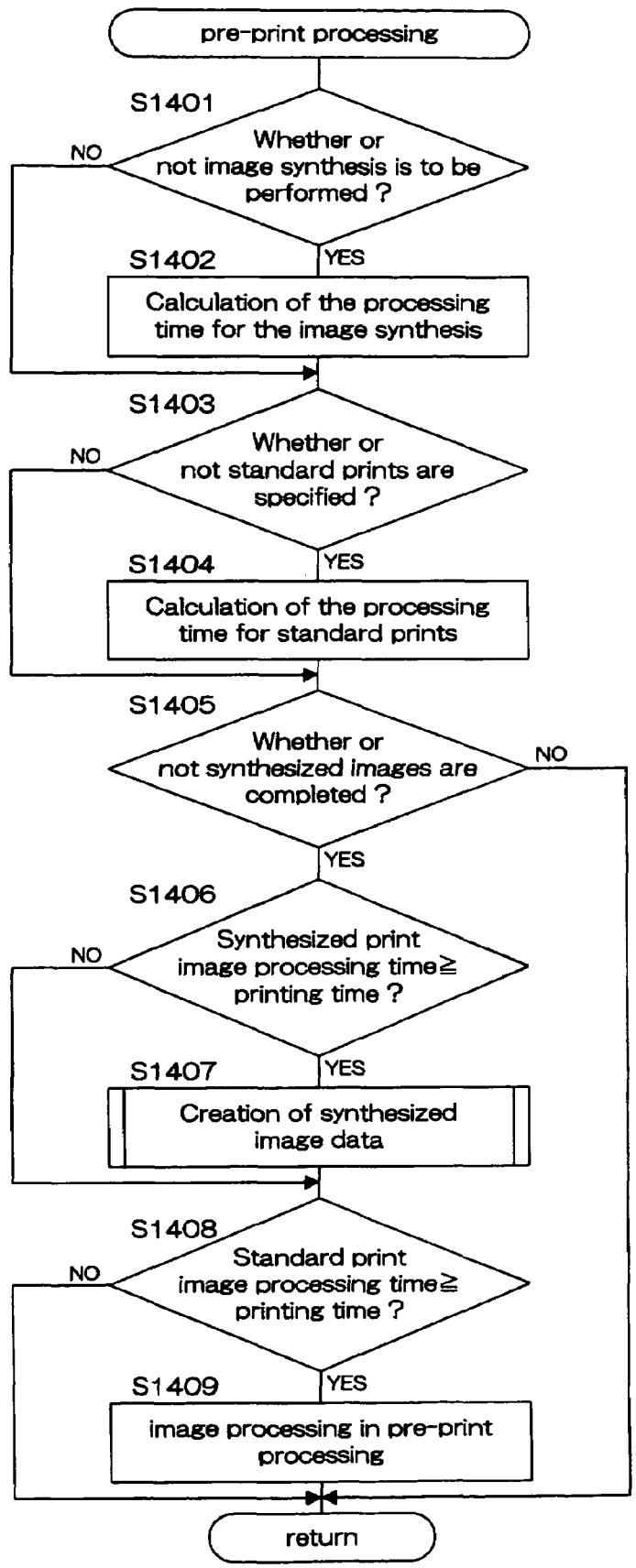
FIG. 19 is a flow chart of the pre-print processing subroutine.

FIG. 19 shows the pre-print processing subroutine (S210 in FIG. 5, S312 in FIG. 6, S411 in FIG. 7). In this subroutine, it is determined whether or not the image processing may be completed within the print control loop period, so that processes that cannot be completed within the control loop are completed beforehand.

It is first determined (S1401) whether or not image synthesis, which takes a substantial period of time, is to be performed. If no image synthesis is to be performed, the printer system skips to S1303. If image synthesis is to be performed, the printer system proceeds to S1402, in which the processing time for the image synthesis is calculated. Table 1 shows the image processing time and the printing time for the image specifications deemed the standard in this image printer system (compressed image data volume: 1.4 MB; image compression method: JPEG; image compression ratio: 1/8). The calculation formula is described below.

It is then determined whether or not standard prints are specified (S1403). If they are not specified, the printer system proceeds to S1405. If they are specified, the printer system proceeds to S1404, in which the standard print image processing time is calculated. The standard print image processing time is explained below together with the calculation method for the synthesized image processing time.

Table 1 (below) shows the standard image processing time. The time shown in this Table 1 is the time under the conditions deemed the standard in this reproduction system (1.4 MB, JPEG compression, 1/8 compression). The basic time includes the data expansion time (ta1c=2 seconds), the automatic image correction time (ta2c=2 seconds), and the resolution conversion (enlargement) time (ta3c=2 seconds). Image synthesis time is the index image synthesis time (basic time tb1c=5 seconds, additional time per image tb2c=2 seconds), the sticker image synthesis time (basic time tb3c=5 seconds), the multi-image synthesis time (two-image tb4c=8 seconds, four-image tb5c=18 seconds), or the template synthesis time (tb6c=4 seconds). In addition, the printing time is eight seconds (tp=8 seconds).

TABLE 1

Standard image processing time

| Item | | | sinbol | time |
|---|---|---|---|---|
| Basic Item | Data expansion | | ta1c | 2 |
| | automatic image correction | | ta2c | 2 |
| | resolution conversion (enlarging) <for print> | | ta3c | 2 |
| Image synthesization | Index image | basic time | tb1c | 5 |
| | | per one image | tb2c | 2 |
| | sticker image | Basic time | tb3c | 9 |
| | multi-image | two-image | tb4c | 8 |
| | | four-image | tb5c | 18 |
| | template synthesis | | tb6c | 4 |
| Printing time | | | tp | 8 |

The time required for image processing for each print type may be calculated using the following formula, for example.

<Standard Print Processing Time>

Data expansion time $ta1=ta1c\times((1/8)/\text{image compression rate})\times\alpha$ (1-1)

(Here, $\alpha$ is a proportional coefficient.)

Automatic image correction time $ta2=ta2c\times(\text{image data volume}/1.4\text{ MB})$ (1-2)

Resolution conversion (enlargement) time $ta3=ta3c\times(\text{image data volume}/1.4\text{ MB})$ (1-3)

Therefore, the image processing time ts for a standard print is (if all of the above are performed):

$$ts=ta1+ta2+ta3 \quad (2)$$

<Synthesized Image Creation Time>

The index image creation time (including data expansion, automatic image correction) it is as shown below.

$$ti=tb1c+\text{number of index image data items}\times(ta1+ta2+tb2c\times\text{image data volume}/1.4\text{ MB}) \quad (3)$$

Because data may have been created for index images for the purpose of image display, it is then determined whether or not the synthesized images are completed (S1405). Where they have already been created, the image printer jumps to S1408. Where the synthesized images are not completed, it is then determined whether or not the synthesized print image processing time (index image creation time, for example) is longer than the printing time tp, and if it is shorter, the printer system skips the synthesized image creation step (S1406). In most cases, the synthesized print image processing time is longer than the printing time, and in that case, the synthesized image creation subroutine (see FIG. 20) is called and synthesized image data is created (S1407).

It is then determined whether or not the standard print image processing time is longer than the printing (exposure) time (S1408). In the case of an image meeting the standard conditions (1.4 MB, JPEG compression, 1/8 compression), the image processing time ts=6 seconds results from Table 1 and the formula (2) and therefore is shorter than the printing time tp=8 seconds. Therefore, when printing essentially standard size images one image at a time, image processing is completed within the printing time tp. However, where the image data volume is relatively large (printing of extremely large data, or printing of multiple images on one piece of paper, as in the case of index printing) or where the image compression rate is large, the image processing time may be longer than the printing time. Consequently, for images for which the processing time is longer than the printing (exposure) time, some of the image processing is completed in the pre-print processing routine so that the image processing time in the print control loop does not exceed the printing time (S1409).

As described above, when the image processing time exceeds the printing time, part of the image processing is completed before image printing begins, and therefore the total printing time may be reduced. For example, when printing essentially standard size images one image at a time, image processing may be completed within the printing time. However, when printing extremely large data, or when printing multiple images while synthesizing them onto one piece of paper as with index printing, part of the image processing is completed before image printing begins. Through this operation, a printer system having the following features may be provided.

(1) Has a simplified print data transmitting/receiving unit.
(2) Offers stability in printed images by maintaining the intervals between printing sessions, considering the period of time required for printing.
(3) Can use relatively inexpensive image processing.

In this embodiment, image processing takes place in the pre-print processing routine whenever the image processing time exceeds the printing time, but it is acceptable if the pre-print processing routine is performed only when the image processing time exceeds the printing time by a certain period of time.

Figure 20:
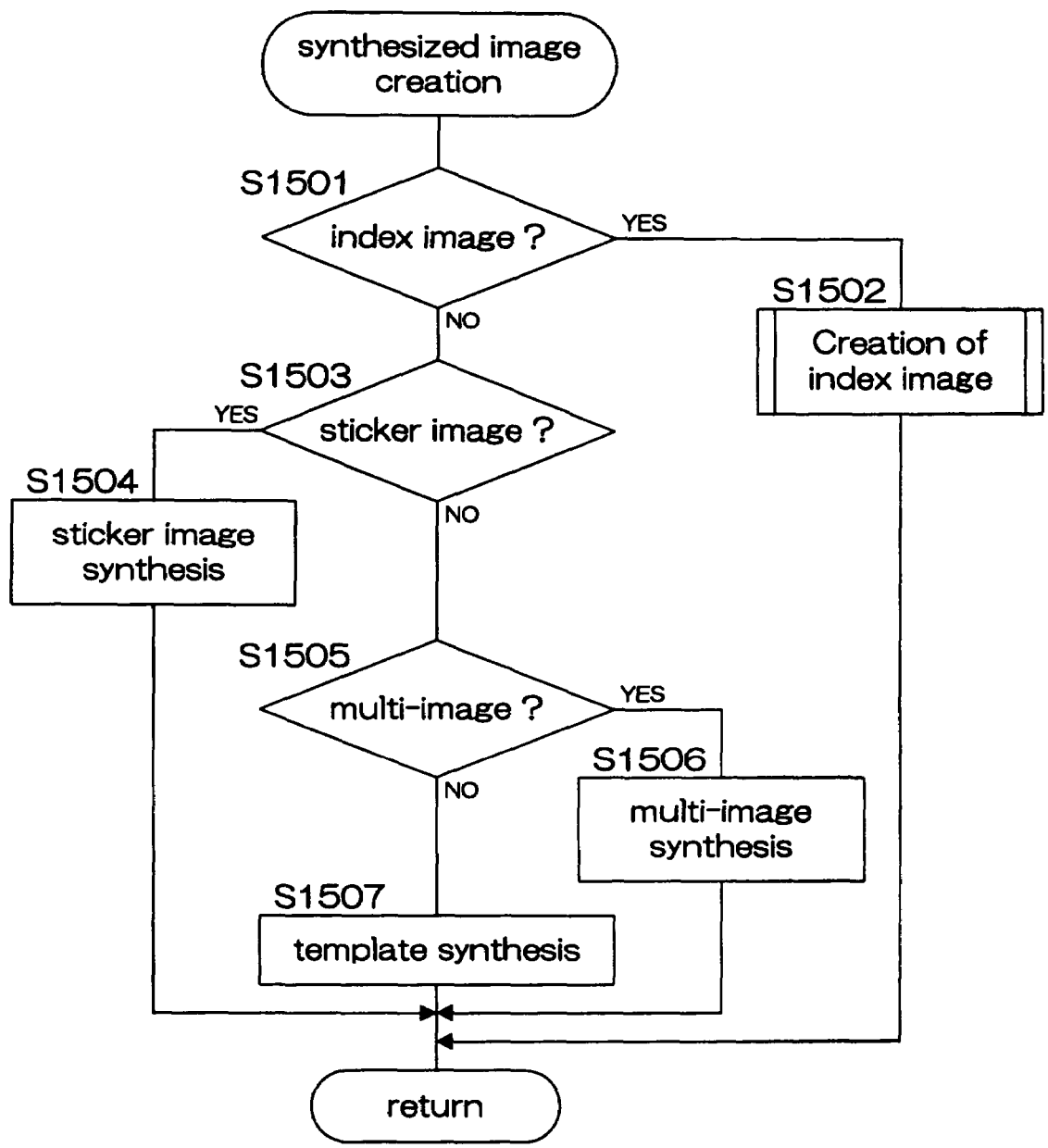
FIG. 20 is a flow chart of the synthesized image creation subroutine.

FIG. 20 shows the synthesized image creation subroutine (S1407 in FIG. 19, etc.). This subroutine is performed in order to create synthesized image data such as for index images and sticker images.

Where it is determined that index images are to be created (S1501), the index image creation subroutine (see FIG. 22) is called to create index images and the printer system returns to the main routine (S1502).

Where it is determined that sticker images are to be created (S1503), the printer system performs sticker image synthesis (S1504) and returns to the main routine. When synthesizing sticker images, the selected frame and the selected image data are synthesized, the images are reduced, and the reduced image data items are aligned.

Where it is determined that multi-image (two-image or four-image) prints are to be created (S1505), the printer system prints two or four images on one piece of printer paper (S1506). While the sequence is not shown with drawings, if the same routine as used for index image creation can be used, the printer system creates multi-image data (in other words, the selected images are reduced to the same size and aligned) and returns to the main routine.

Where the mode is not any of the above, it is determined that the template synthesis mode is active. The printer system then performs template synthesis (S1507), in which a desired type of frame and letters selected by the user are synthesized with the selected image, and returns to the main routine.

Figure 21:
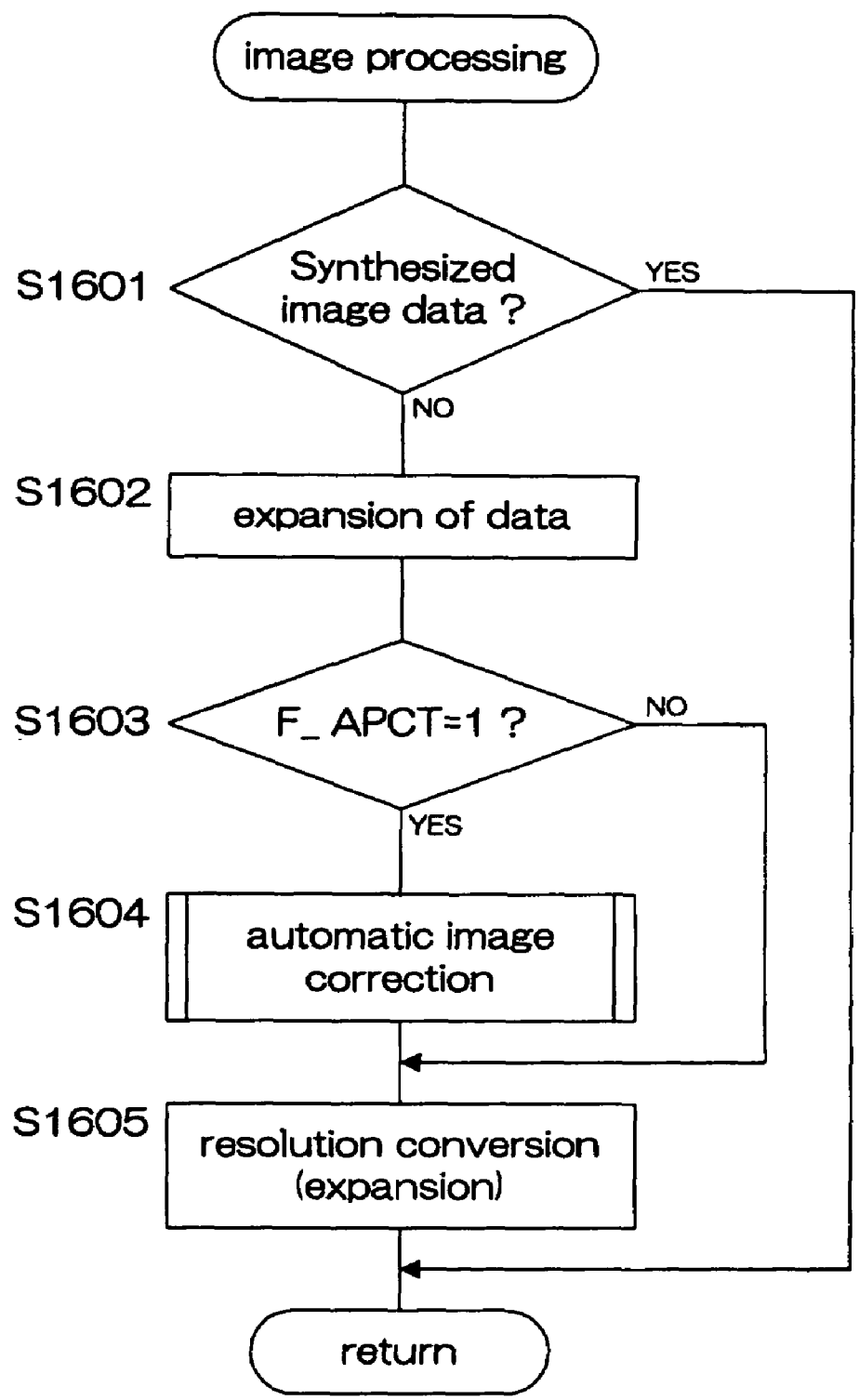
FIG. 21 is a flow chart of the image processing P subroutine.

FIG. 21 shows the image processing subroutine (S211 in FIG. 5, S313 in FIG. 6, S412 in FIG. 7). In this subroutine, image processing is performed while the printer system is in the print control loop. First, it is determined whether or not the data is synthesized image data (S1601). In this embodiment, if the data is synthesized image data, because the image processing time exceeds the printing (exposure) time and the synthesized image data has already been created for user confirmation, image processing is completed before the pre-print processing routine. Therefore, where the data is synthesized image data, the printer system returns to the main routine without any further processing. Where the data is not synthesized image data, it should be original image data, and therefore it is expanded (S1602). In this embodiment, in order to reduce the memory capacity requirement, compressed data is stored in the memory. However, if there is some room in the memory, expanded data may be stored. In that case, step S1602 is skipped. If image processing takes a long time, data expansion may have been completed in the pre-print processing routine. In this case, this step is also skipped.

The printer system then determines whether or not the automatic image correction flag (F_APCT) is set to ON while the user was evaluating the effect of automatic image correction through the index image display, and if it is not ON, automatic image correction is skipped (S1603). If automatic image correction is selected, the printer system calls the automatic image correction subroutine and performs the automatic image correction that is optimal for the type of the camera and the image scene (S1603–S1604). This step is skipped like S1602 if image processing has already been completed.

Resolution conversion for printing then takes place (S1605). In other words, because the image size varies depending on the camera used, and also because the PLZT light shutter array, which is used for exposure, performs exposure using a high 400 dpi resolution, the resolution is increased to meet the PLZT light shutter array level. When completed, the printer system returns to the main routine.

Figure 22:
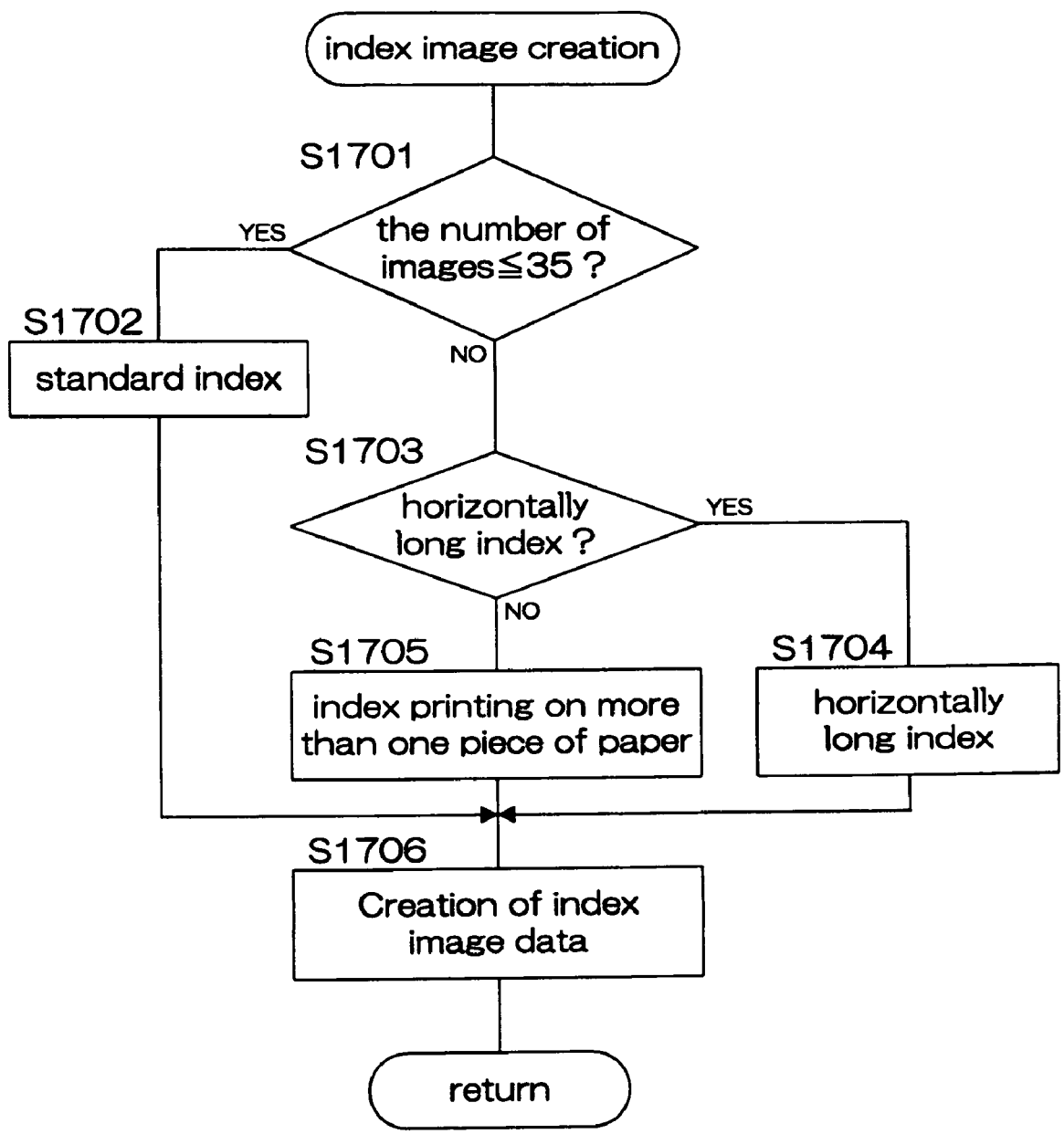
FIG. 22 is a flow chart of the index image creation subroutine.

FIG. 22 is a flow chart showing the index image creation subroutine (S1502 in FIG. 20). It is first determined whether or not the number of images exceeds a prescribed number (35) (S1701). Where it is 35 or less, the images may be printed on one standard piece of paper, and therefore the printer system proceeds to S1702 and sets the standard index. Where the number of images is over 35, all of them cannot be printed on a standard piece of paper, and therefore, the printer system asks the user whether a horizontally long piece of paper should be used or whether the images should be printed on more than one piece of paper. It is determined whether or not a horizontally long index was selected (S1703), and if the result is YES, a horizontally long index is specified (S1704) and the printer system jumps to S1706. If the user did not select a horizontally long index, the printer system specifies index printing on more than one piece of paper (S1705). Index image data is then created based on the specified index form (S1706), and the printer system returns to the main routine.

Image recording media (Smart Media®, Compact Flash®, etc.) that may be mounted in a digital camera are very expensive relative to their storage capacity, and therefore it is likely that the user will specify data save at the same time as printing of the images. Because the printing and saving of the image data may be simultaneously specified, they are performed in one sequence. Consequently, the redundancy and unnecessary waiting time that would be required if data save had to be specified after the completion of the printing operation can be eliminated.

In addition, because the printer system urges the user to insert a recording medium before printing is begun, a recording medium is inserted without failure. Consequently, when printing begins, data saving also is carried out in the same sequence, and therefore the user may leave the image printer system.

Further, using the embodiment described above, even images taken using a digital camera that does not offer high image quality may be corrected and printed with good image quality. Moreover, because the image data that is saved during the printing process is the original image data, when the recording medium in which the images are stored is used for the next session, prints having the same image quality may be obtained, and if the data save (storage) operation is repeated, the image quality does not change.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An image printer system comprising:
   a receiving unit that receives image data from a first image recording medium in an original form in which the image data is recorded in the first image recording medium;
   a printing unit that prints out an image based on the received image data;
   a saving unit that saves the received image data in the original form in a second recording medium; and
   a control unit that begins a printing operation by the printing unit and a data save operation by the saving unit consecutively in case that the both operations are instructed before they are begun.

2. An image printer system as claimed in claim 1, wherein the receiving unit is capable of receiving plural kinds of recording mediums.

3. An image printer system as claimed in claim 1, wherein the control unit begins the printing operation before beginning the data save operation.

4. An image printer system comprising:
   a first portion for setting a medium into which a first medium in which image data is stored is set;
   a second portion for setting a medium into which a second medium in which image data is to be saved is set;
   extracting means that extracts the image data from the first medium set in the first portion;
   a printing unit that prints an image based on the extracted image data;
   a storing unit that stores the extracted image data in the second medium set in the second portion; and
   a control unit that begins a printing operation by the printing unit and a data save operation by the saving unit consecutively in case that the both operations are instructed before they are begun.

5. An image printer system as claimed in claim 4, further comprising:
   a detector that, before beginning the data save operation, detects whether the second medium is set in the second portion.

6. An image printer system as claimed in claim 5, further comprising:
   a display that displays a warning to encourage setting the second medium in the second portion in case that the detector detects that the second medium is not set in the second portion.

7. An image printer system as claimed in claim 4, wherein the control unit begins the printing operation before beginning the data save operation.

8. An image printer system comprising:
   a receiving unit that receives image data from a first image recording medium in an original form in which the image data is recorded in the first image recording medium;
   a correcting unit that corrects the received image data;
   a printing unit that prints an image based on the corrected image data; and
   a saving unit that saves the received image data in the original form in a second recording medium; and
   a control unit that begins a printing operation by the printing unit and a data save operation by the saving unit consecutively in case that the both operations are instructed before they are begun.

9. An image printer system as claimed in claim 8, wherein the control unit begins the printing operation before beginning the data save operation.

10. An image printer system as claimed in claim 8, wherein the correcting unit applies contrast correction to the received image data.

11. An image printer system as claimed in claim 8, wherein the correcting unit applies frequency correction to the received image data.

12. An image printer system as claimed in claim 8, wherein the correcting unit applies color correction to the received image data.

13. An image printer system comprising the steps of:
receiving image data from a first image recording medium in an original form in which the image data is recorded in the first image recording medium;
instructing a printing operation and a data save operation;
printing out an image based on the received image data;
saving the received image data in the original form in a second recording medium; and
beginning the printing operation and the data save operation consecutively in case that both operations are instructed before they are begun.

14. An image printer system comprising:
a receiving unit that receives image data from a first image recording medium in an original form in which the image data is recorded in the first image recording medium;
a printing unit that prints out an image based on the received image data;
a saving unit that saves the received image data in the original form in a second recording medium; and
a control unit that sets a parameter for a printing operation and for a data save operation before they are begun by the printing unit and the saving unit, respectively.

* * * * *